(12) United States Patent
Fäger et al.

(10) Patent No.: US 7,554,511 B2
(45) Date of Patent: Jun. 30, 2009

(54) DEVICE AND A METHOD FOR CREATING AN ENVIRONMENT FOR A CREATURE

(76) Inventors: Jan G Fäger, Fågelpilsgatan 6, SE-723 53 Västerås (SE); Klas Jacobson, Infanterigatan 134, SE-723 50 Västerås (SE)

( * ) Notice: Subject to any disclaimer, the term of this patent is extended or adjusted under 35 U.S.C. 154(b) by 531 days.

(21) Appl. No.: 10/739,414

(22) Filed: Dec. 19, 2003

(65) Prior Publication Data
US 2004/0150666 A1   Aug. 5, 2004

Related U.S. Application Data

(63) Continuation of application No. PCT/SE02/01200, filed on Jun. 18, 2002.

(60) Provisional application No. 60/354,290, filed on Feb. 7, 2002.

(30) Foreign Application Priority Data
Jun. 19, 2001    (SE)    ................................ 0102217

(51) Int. Cl.
*G09G 5/00*    (2006.01)
(52) U.S. Cl. ..................... 345/7; 345/8; 345/9; 345/156
(58) Field of Classification Search ................ 345/7–9, 345/156
See application file for complete search history.

(56) References Cited

U.S. PATENT DOCUMENTS

| | | | |
|---|---|---|---|
| 5,576,780 A | * | 11/1996 | Yancey ........................ 351/211 |
| 5,583,795 A | * | 12/1996 | Smyth ........................ 702/150 |
| 6,005,548 A | | 12/1999 | Latypov et al. |
| 6,072,466 A | | 6/2000 | Shah et al. |
| 6,159,100 A | | 12/2000 | Smith |

(Continued)

FOREIGN PATENT DOCUMENTS

EP    1 060 772    12/2000

(Continued)

OTHER PUBLICATIONS

State, A. et al., "Superior augmented reality registration by integrating landmark tracking and magnetic tracking", *Computer Graphics Proceedings*, Annual Conference Series, 1996, pp. 429-438. http://www.cs.unc.edu/~us/hybrid.html, XP 000682759.

*Primary Examiner*—David L Lewis
(74) *Attorney, Agent, or Firm*—Young & Thompson

(57) ABSTRACT

A device for creating a milieu for a creature in a real environment to the creature, the milieu comprising both at least one part of the real environment and at least one fictitious phenomenon, the properties of the milieu experienced by the creature depending on its position and/or orientation relative to the real environment. The device comprises a member for generating stimuli, the member including a transducer arranged to determine its position and/or orientation relative to the real environment by receiving incident optical signals and recording the relative incident directions of the received signals in relation to the transducer, and an element by which the creature and the transducer are connected for generating the stimuli by information about the position and/or orientation of the transducer and about the real environment, and a unit for transferring the generated stimuli to the creature.

45 Claims, 9 Drawing Sheets

U.S. PATENT DOCUMENTS

Figure 1:
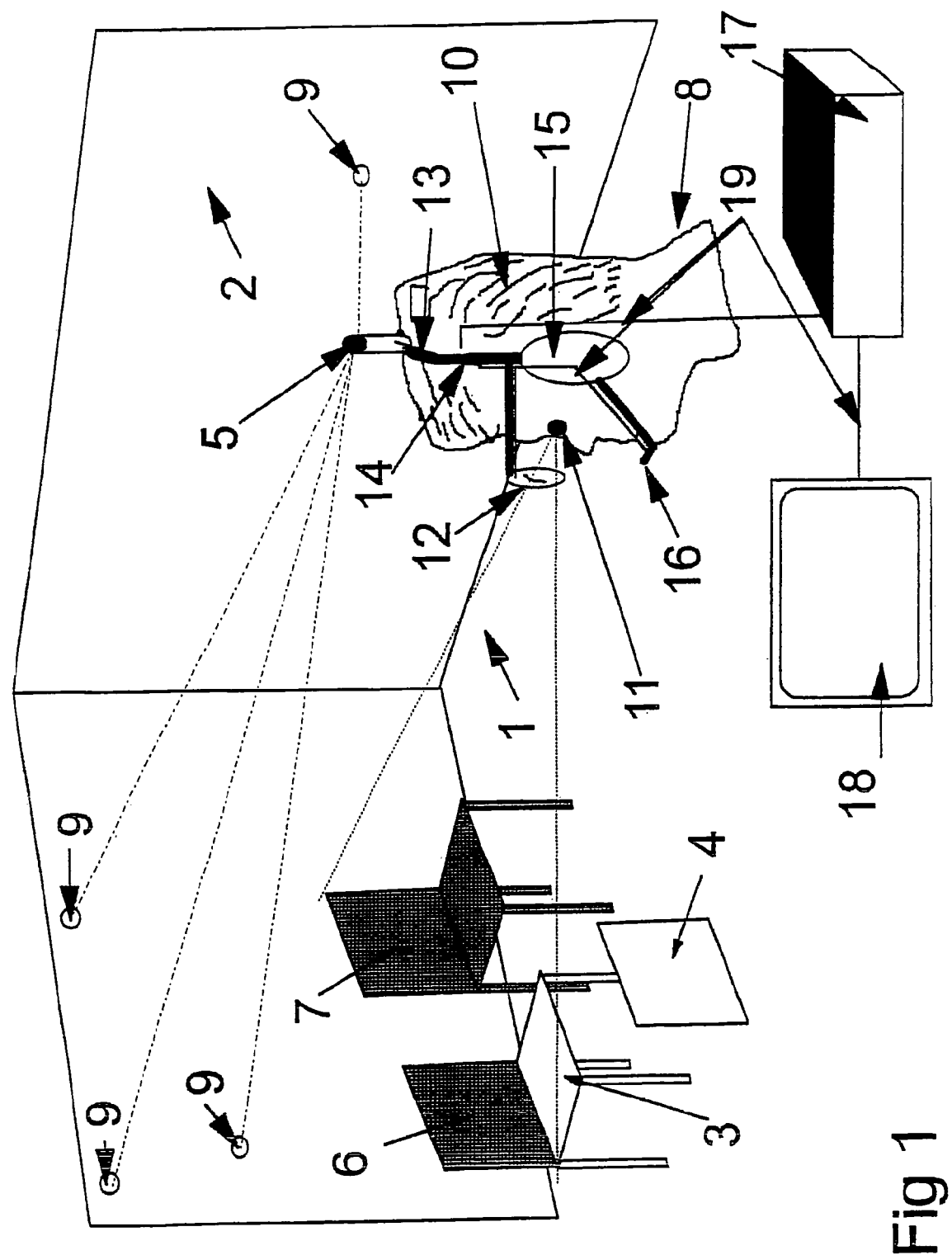

| | | |
|---|---|---|
| 6,278,418 B1 | 8/2001 | Doi |
| 6,317,127 B1 * | 11/2001 | Daily et al. .................. 345/629 |
| 6,522,312 B2 * | 2/2003 | Ohshima et al. ................ 345/8 |
| 6,647,297 B2 * | 11/2003 | Scribner ....................... 607/54 |
| 6,757,068 B2 * | 6/2004 | Foxlin ......................... 356/620 |
| 6,891,518 B2 * | 5/2005 | Sauer et al. ..................... 345/8 |
| 7,064,742 B2 * | 6/2006 | Navab et al. ................. 345/156 |
| 7,190,331 B2 * | 3/2007 | Genc et al. ...................... 345/9 |
| 2001/0041602 A1 * | 11/2001 | Berger et al. ................. 455/570 |
| 2002/0010734 A1 * | 1/2002 | Ebersole et al. ............. 709/201 |

FOREIGN PATENT DOCUMENTS

| | | |
|---|---|---|
| GB | 2 337 828 | 12/1999 |
| WO | WO 01/17628 | 3/2001 |

* cited by examiner

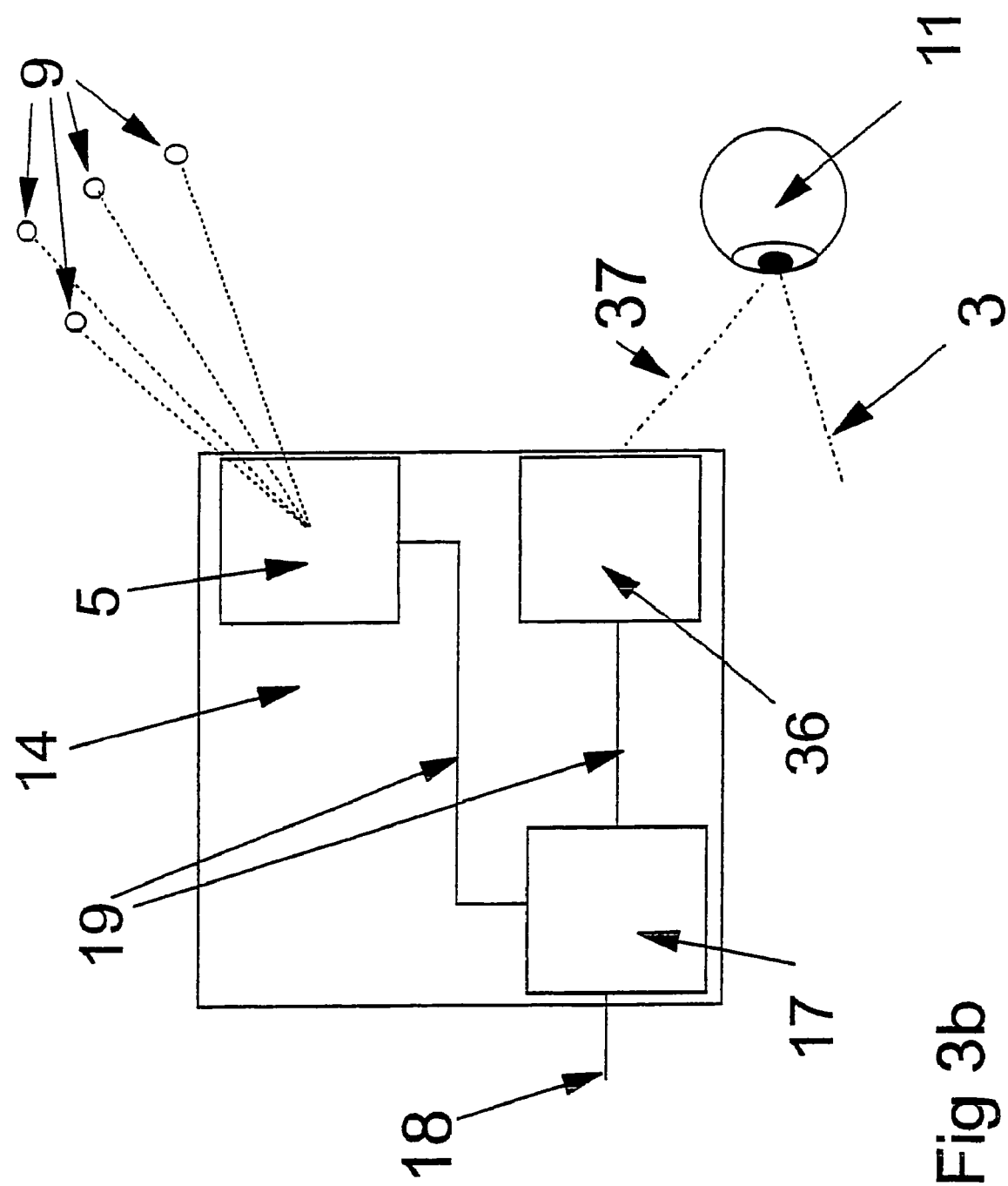

DEVICE AND A METHOD FOR CREATING AN ENVIRONMENT FOR A CREATURE

FIELD OF THE INVENTION

The present invention relates to a device and a method for creating a milieu for a creature in a real environment to the creature, the milieu comprising both at least one part of the real environment and at least one fictitious phenomenon, the properties of said milieu experienced by the creature depending on the position and/or orientation of the creature, or a part thereof, relative to the real environment, and an arrangement comprising two or more devices connected to a network for creating a milieu to a creature in a real environment to the creature by means of respective device, said milieu comprising both at least one part of said real environment and at least one fictitious phenomenon, said properties of said milieu experienced by the creature depending on the position and/or orientation of the creature, or a part thereof, relative to said real environment, and use of such a device.

Such devices and methods may be used for several purposes, but hereinafter primarily the particular, but in no way limiting for the invention, fields of application constituting a means for creating virtual worlds within the entertainment branch of industry, education, simulation and driving of vehicles will be described.

Initially, a number of terms used in the present application will be explained and defined more closely below. In this connection, it is emphasised that the terms "creature", "object", "phenomenon", "fictitious creature", "fictitious object" "fictitious phenomenon", "environment", "properties" "milieu", "indoors", "semi-indoors" "model", "position" "orientation", "authorisation" and "abstract stations" in the text are to be given very broad meanings in accordance with the following definitions.

The term "creature" includes human beings and animals. Although animals belonging to the group of mammal are intended in the first place, also other animals such as birds, fishes, batrachians and reptiles, and insects are included.

By the term "object" both physical things and creatures or parts thereof are intended.

In addition to creatures and things, the term "phenomenon" comprises also steam, liquids, shadows, lights, sources of sound, waves, vibrations, motions, propagating cracks, draught, flows, vortexes, turbulence, discolourations and tints, and other comparable phenomena.

By the terms "fictitious creature", "fictitious object" and "fictitious phenomenon", a creature, an object and a phenomenon which by a creature are perceived as real although in reality they are existing only apparently.

An "environment" may be constituted by one or more physical things or parts thereof and/or creatures, as well as by an arbitrary volume with or without physical limiting surfaces. The volume or the space may include one or more solid objects and/or contain different mediums in a gas and/or a liquid state. It is also possible that there is a vacuum in the volume. In the environment both stationary and movable objects/phenomena may occur. The current environment may be located both outdoors and indoors and possess a great or small extension as compared to the creature.

By the term "milieu" (corresponding to "augmented reality" in the English language), the milieu experienced by a creature is intended, which milieu by providing fictitious creatures, fictitious objects and/or fictitious phenomena to the real environment means that the creature experiences that the milieu has other properties than what is the case for the real environment without these apparent characteristics. In the "changed/improved reality" which the creature in that way takes part of and/or acts within also for example phenomena/properties such as sharpness, colour, perspective, loudness, musical pitch, breath of wind, heat to the body etc may be modified.

The term "properties" covers in principle all features of an environment which may be recorded and/or measured. This means that all chemical and physical states and quantities are included and furthermore that all features of the environment related to the appearance and extension that may be documented are included. A few examples among all possible properties are: that an object is present in a solid state, that a certain oxygen content is present in a position, that a gas has a certain temperature, that an object or a part thereof has a certain extension, shape, texture or colour etc, that any vectorial property is present in a position, such as magnetic fields, acoustic fields, flow etc.

The present invention is intended to be applied primarily "indoors" and "semi-indoors". The term indoors includes all types of locations inside different kind of permanent or temporary buildings and constructions, or naturally occurring enclosings, such as dwelling houses, factory premises, offices, tents, caves, tunnels, mines, but also simpler constructions in which there are walls, pillars, and/or masts which support some kind of roof. The roofs may cover the current area totally or be designed as a net, lattice or battens. Also places inside different kind of crafts, such as vessels, trains, cars, aeroplanes and spacecrafts are counted among the category indoor environments. In the term semi-indoors places located outdoors in the vicinity of constructions or naturally occurring objects and close to the outer limitations of the indoor environments, such as in the vicinity of walls, roofs, masts, pillars, power lines, towers, walls made of bricks or stones, lamp-posts, bridges, trees, rock formations, stones, bushes, long valleys and hills, puddles, shorelines, variations in vegetation, etc., are intended.

It should also be emphasised that the term "model" is intended to comprise everything from very simple models of environments, such as few co-ordinated data, graphs, drawings, maps, etc., to more advanced real or abstract two-, three- or higher dimensional representations, which may be moved, rotated, deformed, changed or processed in any other way, for example in a computer. Furthermore, the models may include photographic still pictures and moving pictures in the form of film sequences. In a model, vectorial quantities, such as a gasflow, may be illustrated by means of arrows in such a way that the direction and length of an arrow denote the direction and the value, respectively of the present quantity. Furthermore, other quantities, which very often are isotropic quantities, such as temperatures, radiation intensities, etc., may be illustrated in the form of differently coloured transparent surfaces representing surfaces in a volume along which surfaces a current quantity has for example a constant value. In addition, holographic reproductions and models of abstract and mathematical character are also included, such as those which depict an environment by means of for example reciprocal spaces.

Furthermore, the terms "position" and "orientation" have the following meanings. A three-dimensional object, i.e. a physical article or a creature, may have up to six spatial degrees of freedom, three translations and three rotations. The "position" of the object is defined by the three quantities which denote translations in relation to the origo of a current coordinate system. These are denoted in this application by x, y and z. However, it is also possible to denote the position parameters in other coordinate systems, for example in polar coordinates, (r, $\phi$, $\Phi$). The "orientation" of the object is defined by the three quantities which denote angles of rotation of the object in the coordinate system. These are denoted in this application by α, β and γ.

In practice, an object often has a number of degrees of freedom which is less than six. A cursor on a computer display, for instance, usually has two degrees of freedom. Its orientation is constant (or irrelevant), and its position is characterized by two variables. Similarly, a three-dimensional object may have such limitations that it has fewer than six degrees of freedom. For example, a block movable on a table has three degrees of freedom—two variables indicates its position on the table top and one variable its orientation, i.e. its angle of rotation about an axis perpendicular to the table top.

A fictitious object may theoretically have an unlimited number of degrees of freedom, and may be defined in an arbitrary, real or abstract metric room, containing linear as well as non-linear rooms, and discrete and continuous rooms. As an example, it may be mentioned that objects may be defined in arbitrary Hausdorff rooms, popularly described as fractal rooms.

"Authorization" means that a creature has admittance, or has not admittance, to a certain area/volume in an environment or to an object, or is permitted, or is not permitted, to perform a certain action. For this authorization it may be special conditions to be fulfilled, such as a certain point of time or a predefined action which has to be performed by the creature or by any other or that a special state is present in the environment or that a certain occurrence has occurred or occurs. Specially, areas and volumes of the environment which are permitted or not permitted may be defined by the fictitious objects and/or fictitious phenomena that have been added to the real environment.

"Abstract stations" are selected sets of positions and/or orientations in the environments which not necessarily need to coincide with the position or extension of a physical thing, but an abstract station may be defined by one or more selected position- and/or orientation parameters depending on, or independent of, the properties of the environment, which environment possibly may include fictitious objects and/or fictitious phenomena, and possibly by a specific time interval.

Herein "fictitious physics" is defined as an amount of mathematical rules regarding how a fictitious object acts in an environment. Thus, the fictitious physics may be considered as a defined set of "natural laws" which is valid for fictitious objects/phenomena. For example, in a computer model, normal physical laws may be valid for the motion of a ball, but the gravitation constant on earth has been replaced by a corresponding constant at the surface of the moon. Thus, a given impact force on a golf ball will give a much higher and longer stroke in the calculating model than it would have done with the gravitation constant of the earth. However, it should be pointed out that the fictitious physics not in any way is limited to making models of only such things which have something corresponding to the real word. To give an example of the above, it may for example be mentioned that for a fictitious object which is deformed to such an extent that if it has been a real object, it would not have been possible to restore the object, "fictitious physics" may be defined which means that under certain conditions the fictitious object may recover its original shape and/or properties.

Furthermore, it should be pointed out that although application examples are initially described below in which the relative movement between the device, or at least parts thereof, and the environment, is performed by moving the device itself, it is in some cases possible to use a stationary device and instead accomplish the relative movement by moving the environment, for example in the-cases in which the environment is constituted by an object which is not stationary installed.

PRIOR ART

Within different fields there is a need of attaining experiences of a virtual reality and/or a changed/augmented reality to a creature. These needs are present within the entertainment branch of the industry and the experience industry, as well as within other fields such as among others industrial design, development, production, construction and driving of vehicles.

The technology of today for creating the experience of completely virtual worlds as well as augmented realities uses computer screens, and/or pictures projected on walls or screens, to a great extent. In more advanced solutions, special 3D-glasses of different types may be combined with special picture techniques for creating a three-dimensional experience. These solutions have the disadvantage that either they are non-precise, which does not give a very good feeling of presence, they require special rooms with stationary projection equipment and/or monitors, or they have to use such systems for determining the position and/or orientation of for example helmets which systems do not enable the helmet to be placed in an arbitrary position and/or orientation, or which solutions have a limited use in proportionately small spaces, such as for example a cockpit of an aeroplane.

Computer games in their most simple form and up to now the most commercially important form use a simple monitor for giving the user a virtual world. Whether it is a completely virtual event or a simulation of for example playing golf, this type of technical solutions strongly fail in its ability to enable an active, physical participation of the user in the virtual world.

A further variant of today's technology is found in for example aeroplane simulators, where the whole simulator may be moved at the same time as direction-dependent pictures are showed on screens that correspond to the windows of the cockpit. Also in this case, the solutions have disadvantages, principally by a limited degree of freedom for the person in the simulator, and/or by the fact that when the person still moves the environment may not be adapted in a natural manner, for example by the fact that lifelike parallax-treatment is missed.

A sophisticated variant of this subject was found during 2001 in Universal Studios Theme Park Adventure Island in Orlando, Fla., US in the form of the attraction Spiderman. A combination of 3D-glasses, movable traversing vehicle in which the person sits and projecting pictures which give 3D-experiences is used. Also in this advanced case, the flexibility is low for the person as regards the possibility to experience the virtual world in accordance with the own desires of the person. In addition, it is not possible with this technology to get two persons, which are present in this environment at the same time, to each experience a world while the acts of one the person effect the environment to the other person and vice versa.

A known system which enables the position- and orientation information in six degrees of freedom is the so-called Polhemus-system (Polhemus Inc., Colchester, Vt., US). The system is used for creating virtual realities as well as changed/augmented realities. The system uses a three axes magnet dipole source and a three axes magnetic field sensor. By varying the transmitted magnetic field sequentially three excitation vectors independent in relation to each other are accomplished. The three vectors sensed by the sensor contain sufficient information for determining the position and the orientation of the sensor relative to the source. However, this system has several disadvantages. One disadvantage is the sensitivity to other magnetic fields occurring in the environment, which for example make the use in a work shop, where a number of varying magnetic fields from engines and instruments, etc. are present, more difficult. Another disadvantage is that adjacent greater metal objects effect the accuracy of the system in a negative way, which means that the system in practice will be unusable for example in a production line for car bodies. A further disadvantage is that the sensor has to be present relatively close to the magnetic field source, which strongly delimits the operation area when at the same time accuracy is required. These disadvantages make that the system is useable only in special environments.

Polhemus and similar systems are used today also for determination of the position of so-called VR-gloves. Also in this case, disadvantages as regards the accuracy of the measurement and the fact that the use is restricted to a certain type of environment are present.

Among other fields, in the field of military aviation different designs of members for creating pictures directly on the retina of a person are used. These pictures may either be used separately, or as a whole or a partial superposition on the picture originated from the environment. Today, mainly very simplified information is superpositioned, for example information in the line of sight of a person, instrument settings and other information dependent upon position and/or orientation. For incorporating orientation relative to target and more realistic complex pictures, a very much greater accuracy of the position and/or orientation information is required than the cases previously mentioned and, thus, it is realised only in cases according to above which are characterized by very rigid and restricting requirements on the environment where the person is present. Thus, in the general case with a freely moveable person, up to the present day, it is not possible to successfully put together real visual impressions and more complex fictitious objects.

In the field of virtual reality or augmented reality there is a lot of devices containing different technical solutions which constitute the state of the art. Typically, these solutions do not offer flexibility and accuracy at the same time. Thus, each of these solutions has a limited or very specialized applicability. Especially, this is clear from the amount of different means for handicapped people, which means have been introduced over the last years. In this connection, the generality of the solutions has been very limited. In many cases it is important not to have several types of equipment for co-operating staff or staff in the same organisation. This is true in the case of military as well as for civilian organisations. Particularly, this is true for private use, where the price/cost is of great importance, that a device mentioned above has to be usable in a very general way to be able to be produced and sold to a great extent and at a price acceptable to the customer.

The use of and the reading of gestures and motions are utilised today among other areas within different search projects for controlling apparatuses or for playing virtual (ball)games. Many of these examples are based on that the person is filmed by a camera/cameras and the pictures are analysed. A disadvantage is then that these devices and methods require fixed installed cameras where the cameras are to be used. Furthermore, often an advanced picture processing is required to extract the gesture from the picture material.

THE OBJECT OF THE INVENTION AND SUMMARY OF THE INVENTION

A first object of the present invention is to provide a device of the kind defined in the introduction, which device reduces at least any of the problems discussed above of already known such devices to a substantial extent.

This object is attained according to the invention by that the device comprises a member for generating stimuli, the stimulation generating member including a transducer arranged to determine its position and/or orientation relative to the real environment by receiving incident optical signals from signal sources in the real environment and record the relative incident directions of the received signals in relation to the transducer, and a means by which the creature and the transducer are connected so that the relative positions and/or orientations of the creature and the transducer are arranged to be within a limited interval, for generating the stimuli by means of information about the position and/or orientation of the transducer and about the real environment, and a unit for transferring the generated stimuli to the creature to thereby realise said milieu for the creature. Hereby, a device is obtained, which device offers a very great flexibility and which may be used in several different applications and environments for giving a creature a desired experience and which at the same time provides a very high grade of accuracy for measuring positions and/or orientations to form the basis for generating the stimuli which are required to realise the milieu for the creature.

A second object of the present invention is to provide a method of the kind defined in the introduction, which method reduces at least any of the problems discussed above of already known such methods to a substantial extent.

This object is attained according to the invention by that the method comprises that the creature is provided with a member for generating stimuli, the stimulation generating member including a transducer which is connected to the creature so that the relative positions and/or orientations of the creature and the transducer are arranged to be within a limited interval, and the transducer determines its position and/or orientation relative to the real environment by receiving incident optical signals from signal sources in the real environment and recording the relative incident directions of the signals received, and that the stimuli are generated by means of information about the position and/or orientation of the transducer and about the real environment, and that the generated stimuli are transferred to the creature to thereby realise said milieu for the creature. Hereby, a method is obtained, which method offers a very great flexibility and which may be used in several different applications and in environments for giving a creature a desired experience and which at the same time provides a very high grade of accuracy for measuring positions and/or orientations to form a basis for generating the stimuli which are required to realise the milieu for the creature.

A third object of the present invention is to provide an arrangement of the kind defined in the introduction, which arrangement is able to combine two or more devices according to the invention so that two or more creatures may take part of or act in a common milieu at the same time, the milieu comprising both real and fictitious phenomena, and particularly in a way so that this may take place while the respective creature still is able to take part of and act in its own created milieu to some extent without that said created milieus of other creatures thereby are directly effected.

This object is attained according to the invention by that the respective device of the arrangement comprises a member for generating stimuli, the stimulation generating member including a transducer arranged to determine its position and/or orientation relative to the real environment by receiving incident optical signals from signal sources in the real environment and recording the relative incident directions of the received signals in relation to the transducer, and a means by which the creature and the transducer are connected so that the relative positions and/or orientations of the creature and the transducer are arranged to be within a limited interval, for creating the stimuli by means of information about the position and/or orientation of the transducer and about the real environment, and a unit for transferring generated stimuli to the creature to thereby realise said milieu for the creature, and that the arrangement includes a means for establishing a smallest common milieu realised to the creatures, on the basis of the milieus generated, in which the respective creature may effect the properties experienced by the creatures. Hereby, an arrangement is obtained, which arrangement offers a very great flexibility and which may be used in several different applications and environments for giving two or more creatures a desired experience and which at the same time provides a very high grade of accuracy for measuring positions and/or orientations to form the basis for generating the stimuli which are required to realise the milieu common to the creatures.

The invention also relates to different uses of the device according to the invention.

Further advantages and advantageous features of the invention are disclosed in the following description and the appended dependent claims.

BRIEF DESCRIPTIONS OF THE DRAWINGS

Hereafter, preferred embodiments of the invention are described as examples below with reference to the attached drawings.

Figure 2:
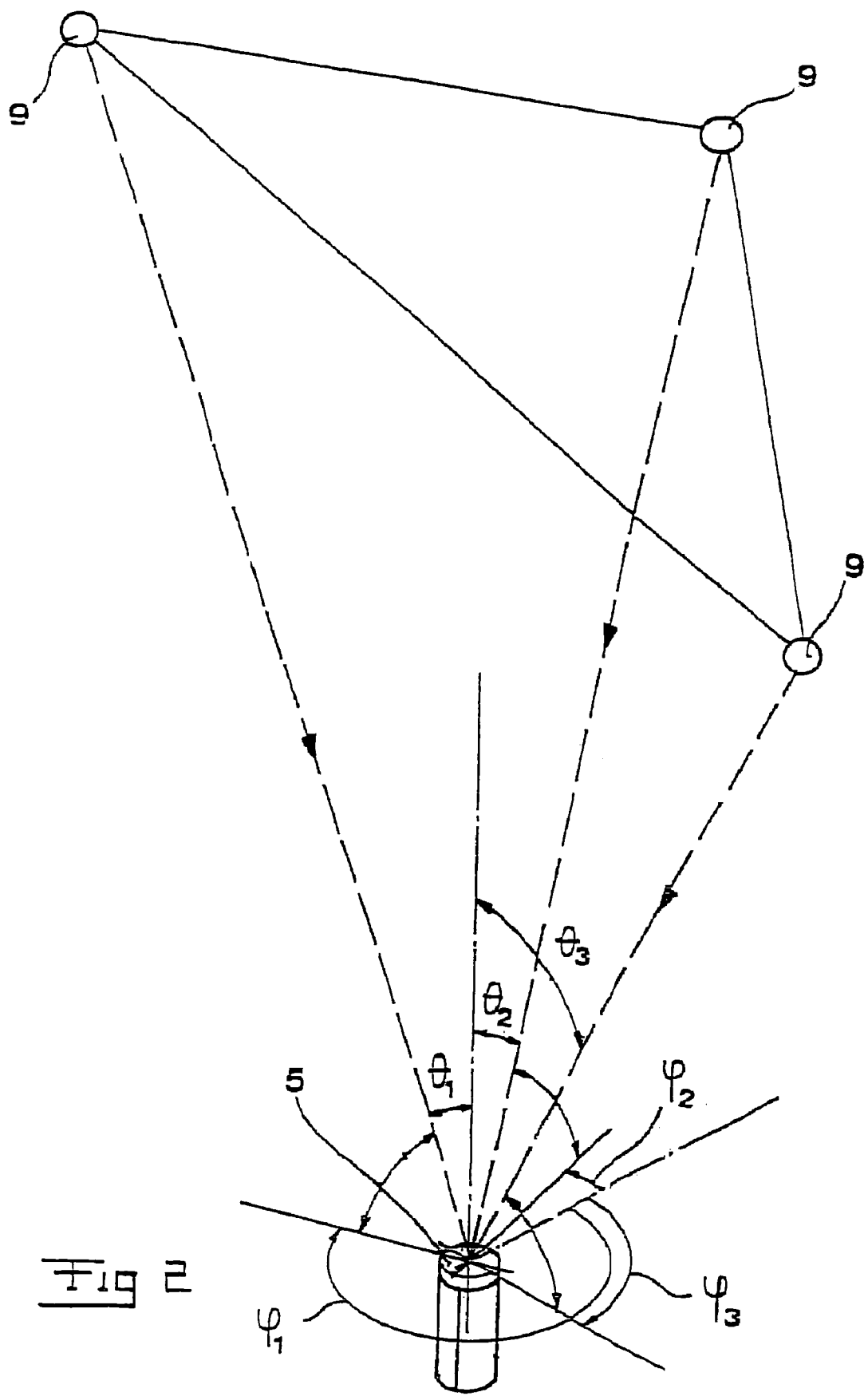
Figure 2A:
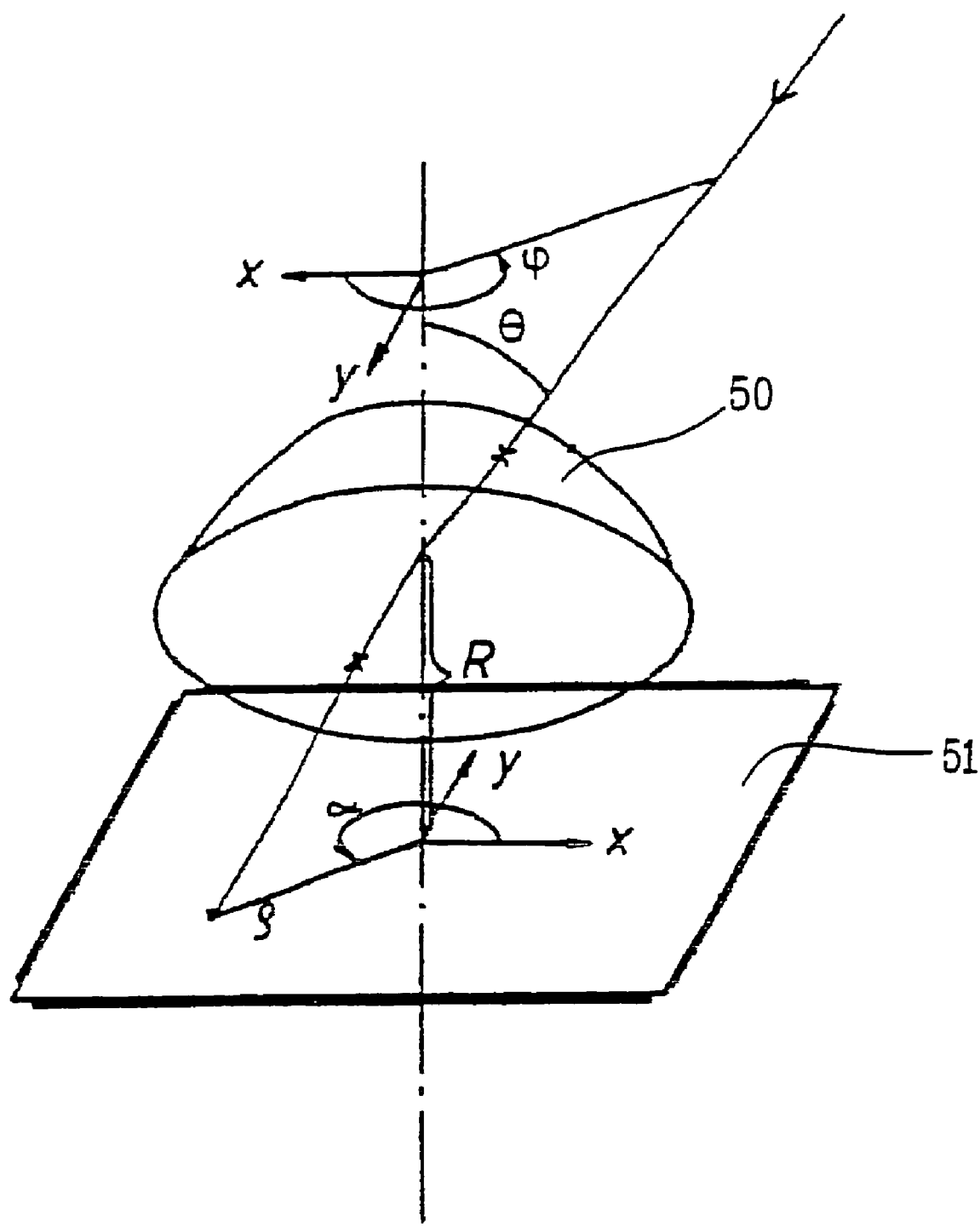
Figure 3A:
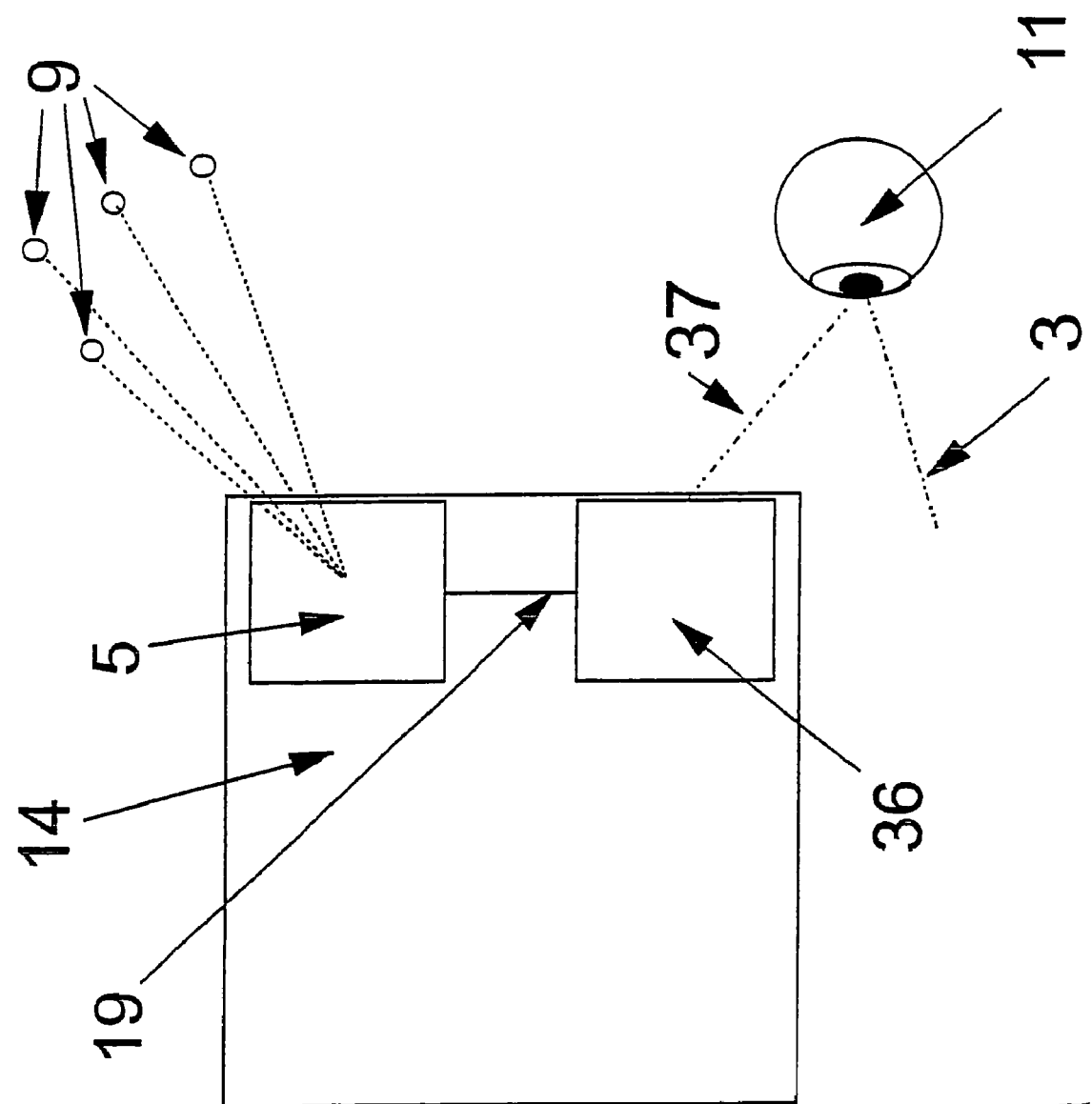

In the drawings:

FIG. 1 is a perspective view of an environment in the shape of a room where a exsisting person sees real objects as well as fictitious objects in a realised milieu, FIG. 2 is a schematic perspective view of a transducer comprised in the invention and on the transducer incident signals originated from signal sources in the environment, FIG. 2a is a perspective view of a transducer included in the invention comprising a wide-angle lens and a detector surface, FIG. 3a and 3b are block diagrams of devices according to the invention and examples of communication lines between components possibly included in the devices, and possible data conversions and model calculations.

Figure 4:
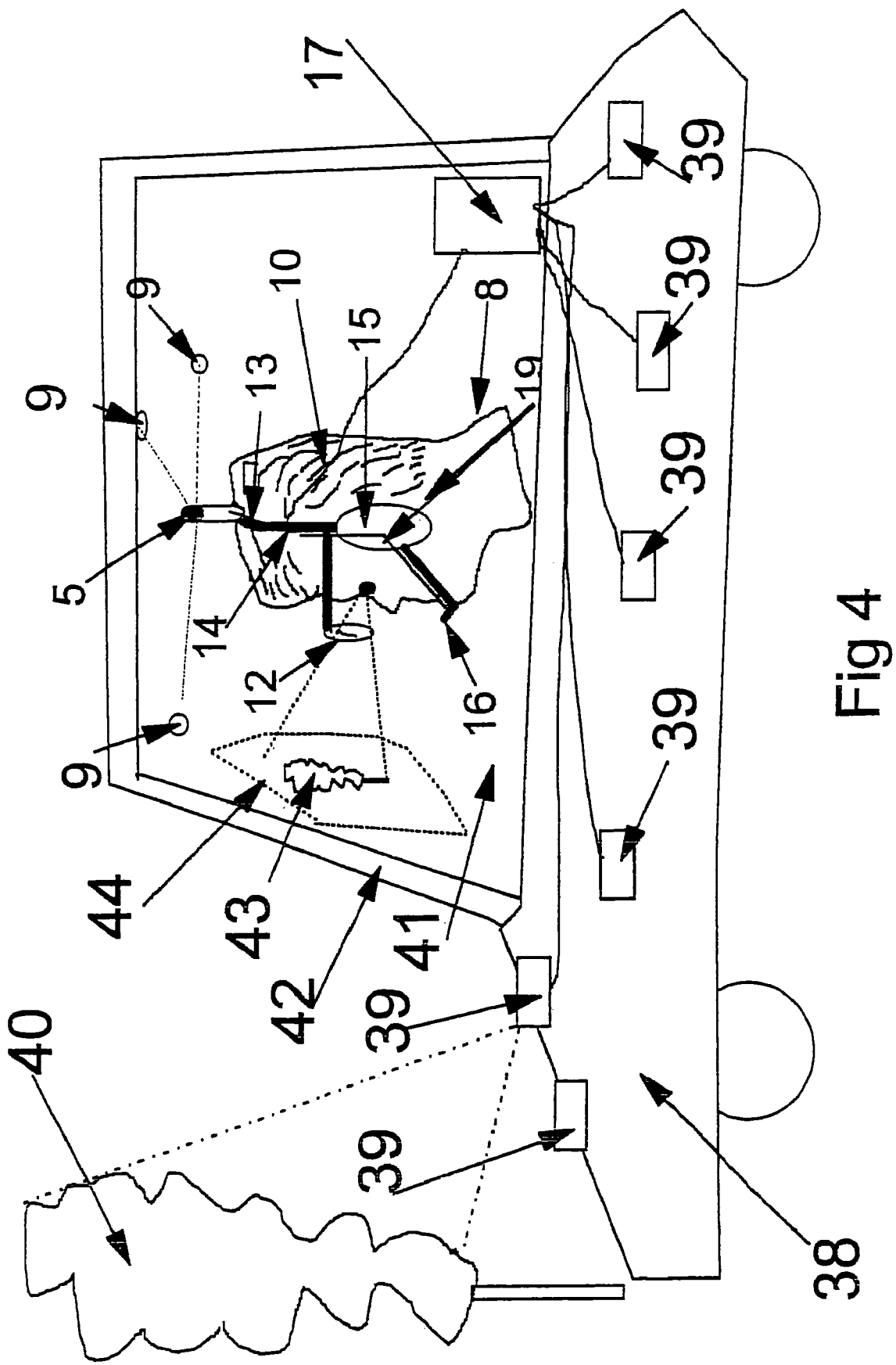
Figure 5:
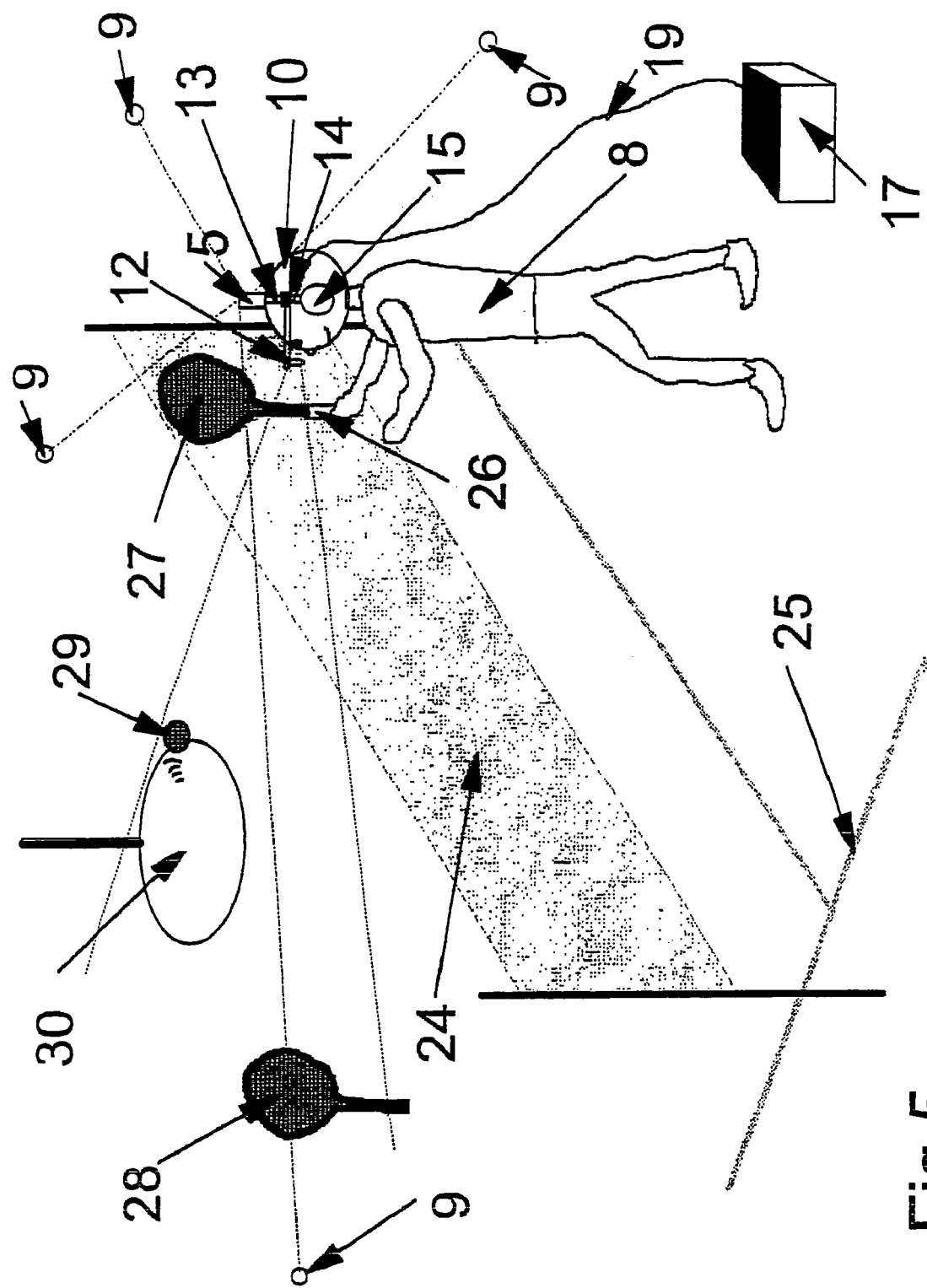
Figure 6:
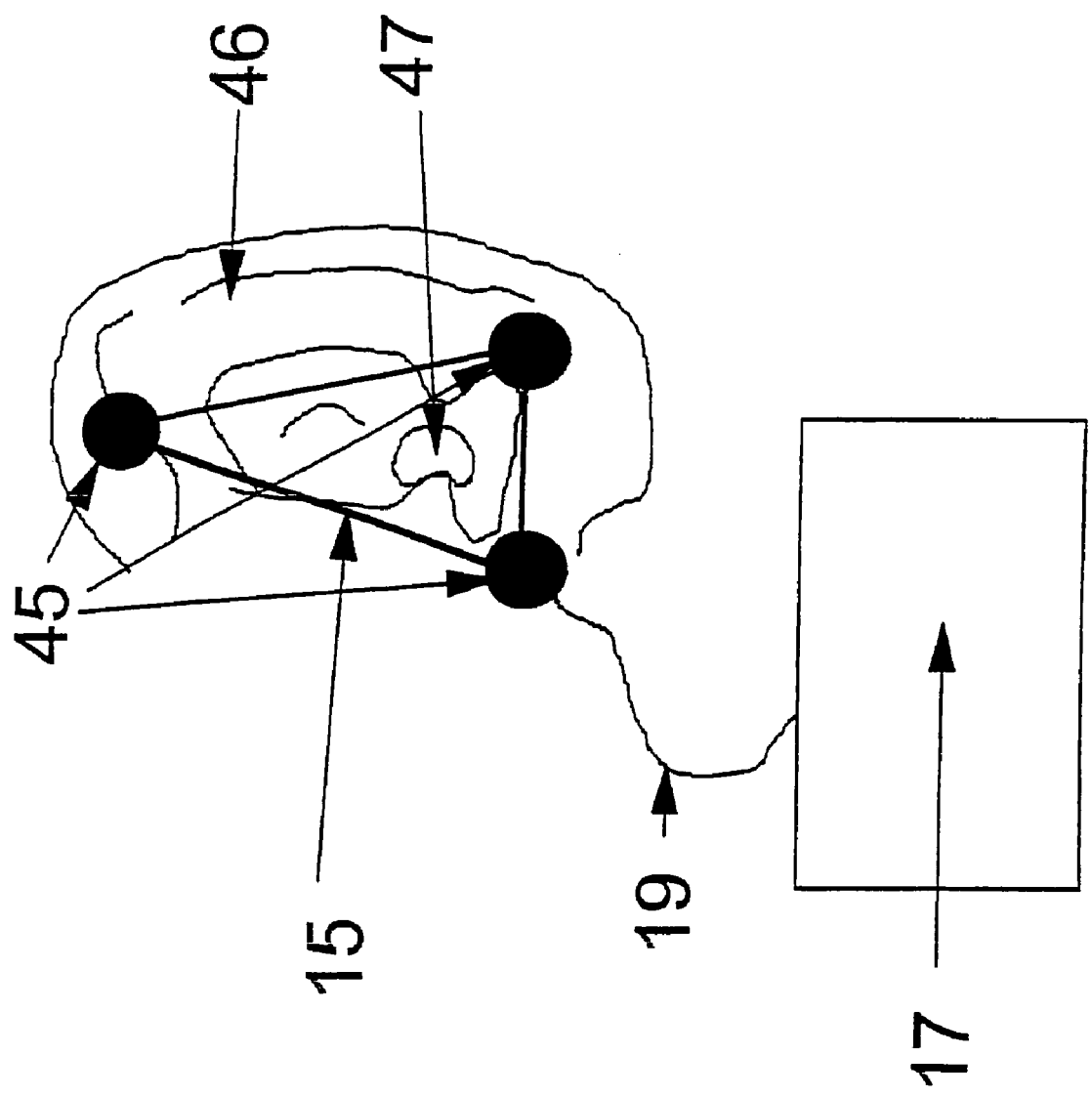
Figure 7:
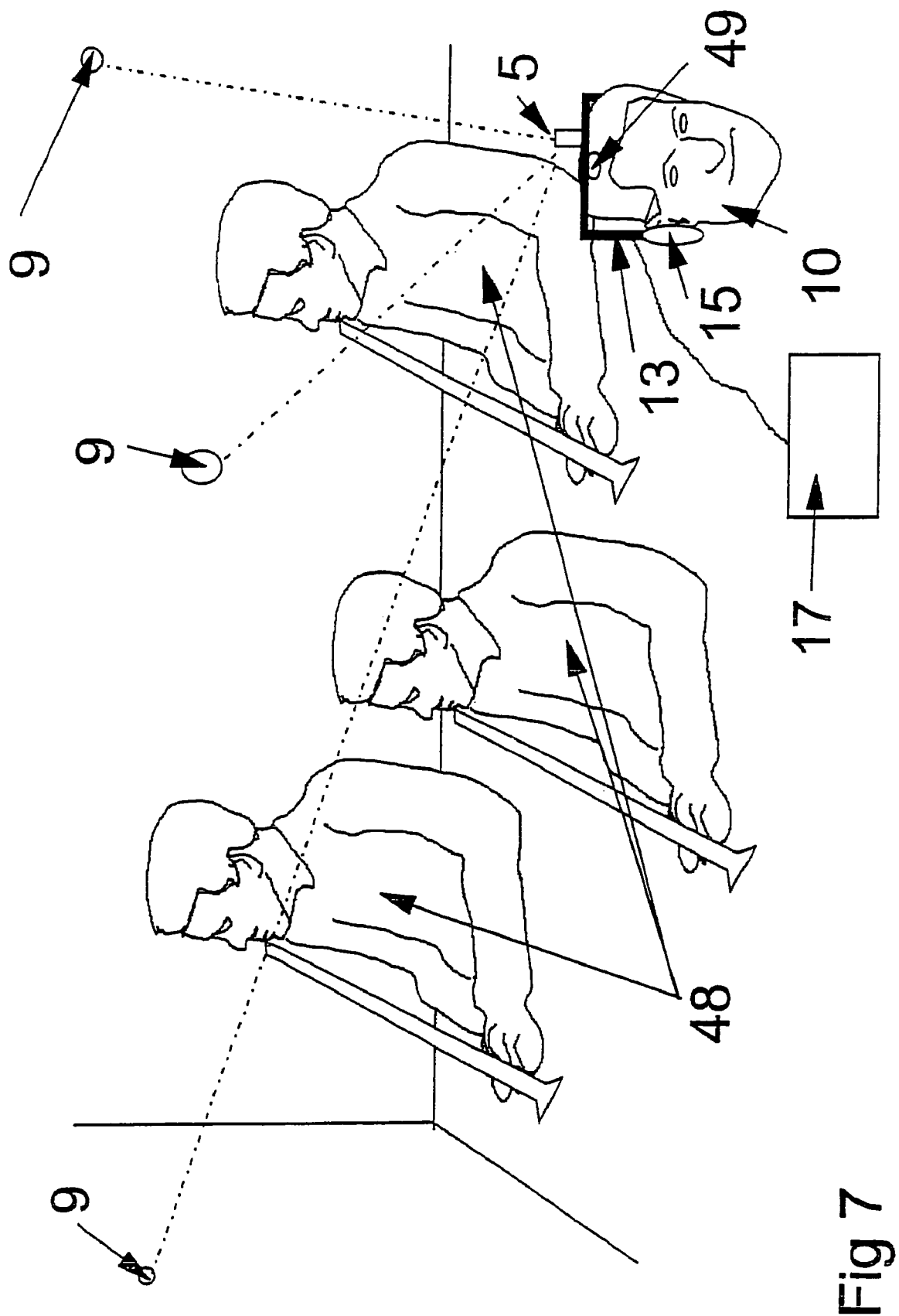

FIG. 4 shows a military vehicle with the device according to the invention to give the driver an outlook in an environment in which the driver is totally protected, FIG. 5 shows a match in fictitious tennis in an environment against a fictitious opponent, FIG. 6 is a schematic sketch of components included in a means for transferring information received by the auditory organ, and FIG. 7 shows a fictitious orchestra.

DETAILED DESCRIPTION OF PREFERRED EMBODIMENTS OF THE INVENTION

The stimulation generating member mentioned in this application may in its most simple embodiment be constituted by a transducer for receiving incident optical signals from signal sources 9 in the real environment, a means for connecting the transducer and the creature to each other, and a unit for transferring the stimuli generated by means of the stimulation generating member to the creature.

The connecting means may be for example, a glue, or a bag for carrying the transducer or a band accommodating the transducer which band is intended to be applied on the creature, such as a collar, bracelet or the like. However, it should be emphasised that the connecting means may be included in the transducer itself and be provided by the design of the transducer without using any component in addition to the transducer. As an example, the transducer may be provided with a connecting means in the form of a "handle" so that the transducer may be connected to the creature for example by the fact that the creature quite simply grasps or bites the transducer. The transducer may also be designed to be implanted into the creature.

It should also be emphasised that the term environment defined in the introduction in its simplest embodiment may comprise only the signal sources from which the transducer is intended to receive signals for the position- and/or orientation determination, which will be described further below.

Even if it is not described in detail for all embodiments, it is pointed out that for all applications and embodiments described herein, signal sources in the environment are used for transmitting, reflecting or spreading signals which signals are received by a transducer with the purpose of determining the position and/or orientation of the transducer. Furthermore, throughout the description, similar reference numerals denote same or analogous objects.

In FIG. 1, a real environment, which is constituted by a room 1, some of the limiting surfaces 2 of the room 1 and a number of things 3, 4 present in the room 1, is illustrated. Although in this case, the environment is a schematically depicted room in a building, in practice, the environment may be any indoor or semi-indoor environment having several properties and phenomena. In this embodiment, the environment is thought to be an ordinary room in a house. This room is being furnished. In this case, two chairs delivered as a construction kit will be assembled and placed in the room. In the moment of the process, which this figure represents, one chair is partly put together 3 where the back 4 remains to be assembled. A creature 8, illustrated in the current figure only as a head 10 of a person, is present in the room 1 and is provided with the stimulation generating member 14 according to the invention, which member comprises a transducer 5 for determining the position and/or orientation of the head relative to the real environment in such a way that the positions and/or orientations of the eye/eyes 11 are determined, that the positions and/or orientations of a means included in a transferring unit, for transferring visual information 12 to the creature, are determined.

In this connection, it is interesting to determine the position and/or orientation of the eyes 11 and of the means of the transferring unit for transferring visual information 12, relative to the real environment 1 so these positions and orientations may be inserted into a three-dimensional model of the environment which model is stored in a computer 18. In this connection, the control- and calculating unit 17 included in the stimulation generating member, from the model taken from the computer 18, the position and orientation of the person and models input to the control- and calculating unit by programmes which may generate different visual objects, in the current example chairs and parts thereof, may calculate the information which is to be communicated to the means for transferring visual impressions 12 of the transferring unit, so that generated pictures of the fictitious phenomena may be incorporated with great accuracy in the real picture information of the room 1, the milieu being realised for the person. In this connection, the person 8 will see a milieu constituted by the real objects; the half-completed chair 3 and the back 4 of the chair not yet assembled, and a fictitious object 6 which shows how it will look when the back of the chair has been assembled and a fictitious object 7 in the form of a further chair as it will look when the chair has been put together. A means for communication between the transducer and the transferring unit of the device, and the separately located control- and calculating unit 17 including signal paths 19, comprising either cables and/or wireless communication by for example Bluetooth-technology, connects in this case the components of the device for transferring signals. The models for generating the fictitious objects in this specific case are assumed to be created by a furniture manufacturer. In this example, the person controls the position and/or orientation of the fictitious chairs, or the parts thereof, by vocal commands via the microphone 16 to the control- and calculating unit 17.

The transferring unit mentioned before includes a means for transferring visual information 12 and a means for transferring information, to be received by the auditory, in the form of headphones and a microphone 16. Preferably, the transducer 5, the two means 12, 15 and the microphone 16 are arranged in a so-called headset 13 to enable the user to utilise the equipment in a comfortable way. Thus, the headset 13 mentioned above constitutes a connecting means by which the head 10 of the person and the transducer 5 are connected so that the relative positions and orientations of the person 3 and the transducer 5 are arranged to be within a limited interval. Thus, by means of the information about the position and/or orientation of the transducer 5 the position and/or orientation of the head 10 and of the eyes 11 of the person may be determined.

Furthermore, the transducer 5 is arranged to receive incident signals from signal sources 9 in the environment, which signals propagate rectilinearly between the signal sources 9 and the transducer 5, for achieving the position- and/or orientation information, and the transducer 5 is arranged to repeatedly determine its position and/or orientation relative to the environment when the transducer 5 and the environment are moved relative to each other, i.e. when the creature 8 moves and/or moves the head. Furthermore, the transducer 5 is arranged to be freely movable and mechanically unguided by the environment in an arbitrary coordinate system by the carrier of the transducer.

With the expression that the position of a thing or of a creature is determined in this application is intended that at least some of the position parameters (x, y, z) is known in a coordinate system, the relation to the environment of which is known. By the expression that the orientation of a thing or of a creature is determined in this application is intended that at least one of the orientation parameters ($\alpha$, $\beta$, $\gamma$) is known in a coordinate system, the relation to the environment of which is known.

Depending on the current application of the invention by the expression the position and/or orientation of the creature, the position and/or orientation of one or more specific parts of the body is intended. In many cases where the present invention is used, the head of the creature, having the usually occurring visual organ, auditory organ, tactile organ, gustatory organ and olfactory organ, would probably constitute the part of the body which is intended. In other cases it may be hands, fingers, a tail or another part of the body which has sensory organs, for example tactile sense, but also other special sensory organs of animals, which will be stimulated to obtain experiences. The number of transducers/members and their position- on the creature, and the requirements of accuracy in the position and/or orientation determination, depend on these desires to a great extent. However, it should be particularly pointed out that it is not always neither necessary nor desirable in the current application that the transducer is located on the part of the body which is to be given the stimulus.

One type of transducer 5, which may be used as a component in the device according to the invention has been developed and introduced into the market by MEEQ AB, Hässlögatan 20, SE-721 31 Västerås, Sweden.

With the measuring method described in this application and in the Swedish patent No. 444530, 458427 and 506517 it is possible to perform measurements, i.e. to determine position and/or orientation with a great accuracy. In some cases with an accuracy in the magnitude of tenth of millimeters, or better, as regards position and tenth of a mrad, or better, as regards the orientation. Furthermore, by the fact that the incident directions of incident signals are recorded, and by the fact that the transducer knows its own position and orientation as well as the positions of the "desired" signal sources, there is a possibility to sort out "false signals" originated from for example non-desired signal sources, alternative signal sources or reflected signal sources. By using more than the smallest number of signal sources required also disturbances in the form of obscured signal sources may be handled by the equipment without effecting the accuracy to any appreciable extent.

When the invention is applied, it is suitably proceeded so that before the user utilises the equipment, the transducer 5 is brought to receive signals from at least two, preferably three or four, and usually from five or more signal sources 9, which define the coordinate system of the environment, by that the transducer 5 is moved throughout the room 1, until the transducer 5 has received sufficient information about the positions of the signal sources 9, i.e. about the coordinate system of the environment, which may be performed by hand by a person 8 or by means of a vehicle, a freely movable robot or the like. If, in addition, it is required that during the subsequent use, the absolute scale of length shall be known, the measuring of the signal sources 9 is performed while simultaneously using a measuring standard, for example by placing an object with well known dimensions as a reference gage in the environment during the measuring procedure.

The transducer 5 may be a two-dimensional transducer of the kind which is described in the Swedish Patent No. 444530. Thus, the transducer may be an optical instrument, which works with "optical signals", which in this application refers to signals, which are constituted by, or utilised, optical radiation within as well as outside the band of visible wavelengths. The wavelength range, which is preferably intended, is in the interval 10-15 000 nm. Suitably, the wavelength range 200-1600 nm may be applied, but it should be emphasised that the invention is not in any way restricted to this wavelength interval. A number of signal sources 9, for example in the form of light emitting diodes, may be arranged at a distance from the transducer and from each other, so that in normal use of the transducer, always at least three, preferably four of the signal sources simultaneously may transfer signals to the transducer. The positions of the signal sources relative to each other are known, for example by measuring the positions of the sources in a coordinate system common to the sources, which measuring may be performed by means of the transducer. Concerning measuring of the positions of the signal sources in general reference is made to the Swedish Patent No. 506517.

In FIG. 2 it is schematically illustrated how signals from three signal sources 9 incident on the transducer 5 and how the incident angles of the received signals are related to each other. The incident direction for respective signal is defined by $\phi i$ and $\theta i$, where $i=1, 2$ or 3. The incident directions are then the basis for calculating the orientation- and position determination required.

As an example, in FIG. 2a, a wide-angle lens 50 and a surface 51 for detecting the signals are illustrated. A signal from a signal source 9 in the environment which incidents on the wide-angle lens is depicted on the detector surface at a position which corresponds to the incident direction ($\phi$, $\theta$ of the signal relative to the transducer 5. By detecting a unique position, i.e. its relative x, y-coordinates on the detector surface, the incident direction $\phi$, $\theta$ of the signal may be derived, i.e. the direction of the sight line from the transducer to the current signal source may be determined.

Briefly, the orientation- and the position calculation may in this case be performed by that three, in general four, signal sources 9 are selected, the directions relative to the transducer 5 of the sight lines from the transducer 5 to these signal sources 9 are determined, the position and orientation of the transducer 5 being obtained by using the directions of the sight lines, and the known positions of the signal sources 9 and geometrical relations between these quantities. The positions of the signal sources 9 relative to each other are assumed to be known. Alternatively, the relative positions of the signal sources 9 may be known indirectly through that the position of each source is known in a coordinate system.

Advantageously, the signal receiving direction area which is constituted by a solid angle and which is formed by the collected amount of signal receiving directions from which the transducer is arranged to receive incident signals from said signal sources, of the transducer, is at least 0,2 steradians, otherwise it is difficult to maintain the performance concerning the determinations along the axis of the transducer, i.e. in the main direction of the transducer, so that this is in parity with the two other axes of the transducer. However, preferably this signal receiving direction area is at least 1 steradian, and the larger such area, the fewer number of signal sources are required in the environment to obtain a certain accuracy in the determination of the orientation and the position of the transducer relative to the environment. The more objects which move in the environment, and the more complicated geometry of the environment due to for example protruding boxes, oblique corners and other things that obstruct, the larger said signal receiving direction area should be, and in a workshop with a lot of movable parts it may be advantageous to have a signal receiving direction area exceeding 4 steradians, and still possibly more than 100 signal sources may be needed in the environment for attaining a reliable determination of the orientation- and position information for the transducer. In that case, it is also preferred that the signal receiving direction area is topologically connected, even if this is not any definite necessity.

Said signal receiving direction area may have any shape and spreading over the imagined solid angle sphere. According to a preferred embodiment of the invention, the signal receiving direction area of the transducer is topologically connected, which however includes that it could have enclosed direction areas without signal receiving capability. The signal receiving direction area is independent of external factors and relates only to the receiving directions of the transducer. It is not affected by limitations in the form of external blockage of direction areas or any partial absence of signal sources.

It is preferred that the signal sources are well spread out within the signal receiving direction area of the transducer, since this improves the probability that an arising disturbance, such as obscuring of some part of the environment through persons, fork lifters, robots or similar, does not prevent achieving of correct information, even if the number of signal sources in the environment are kept on a proportionately low level. However, it is really the design of the device according to the invention, especially with a broad signal receiving direction area, that makes such a well spreading not as important as in previous known devices of this type.

About the signal receiving direction area the following may be added: A signal receiving direction area comprising less than 0,2 steradians is for natural reasons difficult to use in practice, since in such a case a small number of objects blocking in the environment may easily disturb the transducer so it does not work. In addition, in the case of such small signal receiving direction areas the number of required signal sources in the environment becomes impracticably large and it is that which in practice restricts the user. In addition, with such small, particularly if they are connected to each other, signal receiving direction areas, it will be difficult to maintain the same high measuring accuracy of positions in all position measuring directions.

Preferably, the signal receiving direction area should exceed 1 steradian, so that the number of required signal sources becomes reasonably large and so that a fairly uniform measuring accuracy of positions then may be obtained.

If the environment is geometrically complex, with for example many and possibly movable objects, reflecting/mirroring surfaces and/or transducer positions in the vicinity of big objects without signal sources, where a typical such an environment may be a film studio in which many persons, cameras, props, side-scenes, mirrors and vehicles are present at the same time, the signal receiving direction area should exceed 2 steradians. A further reason for a larger signal receiving direction area is that the transducer shall not have a restricted working range as regards firstly orientations because of large hidden sectors without signal sources. Particularly, in complex environments where it occur large objects blocking signal sources and the number of signal sources is limited, also signal receiving direction areas, which exceed 4 steradians, are desired.

The distribution of signal sources over the working range may preferably be adapted to the requirements of measuring accuracy in different parts of the environment and to the nature of the environment. This considerably facilitates the possibility to use signal sources naturally occurring in the environment. The need of the number of signal sources certainly depends on also the signal receiving direction area of the transducer, in accordance with the above mentioned, since the smallest number of signal sources recorded by the transducer in the normal case must be equal to or exceed 4. An increased number of signal sources give, however, both higher accuracy and improved durability against further disturbances.

The construction of a transducer and the construction of the corresponding calculating circuits and the function thereof are as mentioned before more closely described in the above mentioned Swedish Patent No. 444 530.

The signal sources 9 may be active signal emitting sources, such as light emitting diodes or the like, the light of which may possibly be pulsated or modulated, or passive signal sources 9 such as reflecting markers made of for example reflecting tape. The markers may be plane figures or—to show the same shape independent of the viewing direction—be constituted by reflecting spheres. Furthermore, the markers may have different shapes in relation to each other to make it easy for the calculation unit and the signal processing circuits thereof to identify and keep apart different markers and alternatively, with the same purpose, markers with the same shape but with different sizes and/or "colour" may be used, the colour term including also not visible parts of the electromagnetic spectra. In the use of passive reflecting signal sources 9, the device may include means for transmitting of signals intended to be reflected by the reflecting markers. The transmitting means, which in such a case suitably are arranged in connection to the transducer 5, may transmit infrared light for instance, preferably pulsated or modulated with a certain frequency to be able to separate the current signals from interfering light sources, for instance.

In an alternative embodiment no specially arranged signal sources are required, but as signal sources are used suitable details already present in the environment. Examples of suitable details are corners, holes and similar, which have a characteristic appearance and well defined and known positions. When the device is started these details are pointed out and identified in a suitably way, and their positions are determined and stored, for example through downloading from a CAD-system, or alternatively they are measured by the transducer. The details used as signal sources may be illuminated only from regular lights in the room, but certainly special light sources may be arranged to give the illumination the desired intensity or character if required. Certainly, at least some of the signal sources may be constituted by specially arranged markers, for example, by portions, patterns or figures of light tape placed on a dark background. In the Swedish patent number 458 427 it is closer described how the position and orientation of a transducer of this type may be calculated, as well as the construction and the function of an equipment for performing this calculation.

In FIG. 3a a block diagram is illustrated, from which the different components and the corresponding communication paths of an embodiment of the invention appear. The stimulation generating member 14 of the invention includes a transducer 5 and a transferring unit 36. The transducer determines its position and/or orientation in an environment by means of the signal sources 9 according to the method described above. The position- and/orientation information is communicated to the transferring unit directly via for example a cable 19. In this very simple case, in this case, for a simple environment, the position- and orientation information is analogically transformed to a light beam 37, which is transferred to the eye 11 of a creature. The eye of the creature receives at the same time other stimulation in the form of a picture 3 of an object in the real environment, said milieu being realised for the creature.

In FIG. 3b, a further block diagram is illustrated, from which the different components and the corresponding communication paths of a further simple embodiment of the invention appear. In addition to what was comprised in the previous example, the simulation generating member 14 comprises in this example a control- and calculating unit 17. This unit is arranged to receive position- and orientation information from the transducer 5 via, in this case, a cable 19 and in this example also model information from an external computer 18. In the control- and calculation unit calculations are made based on the model information obtained, and the position- and orientation information. The results of said calculations, in the form of a generated stimulus, are transferred to a transferring unit 36, which converts it to a light beam 37, which is transferred to the eye 11 of a creature. In the same way as in the previous example, thereby a milieu is realised for the creature.

In FIG. 4, the driver 8 of a military vehicle 38 sits in an environment, which is constituted by the driving compartment 41, which here is characterised by that the armour plate 42 has absolutely no windows or other means, for example a periscope, to give the driver the required direct outlook over the external environment. By this arrangement, the driver is protected also from different types of dazzling in addition to increased physical protection. Outside the vehicle 38, in the interface to the external environment, means 39 for recording picture information, in one or more wavelength intervals, and/or sound information, are fixed mounted or located in a way which means that they may be directed in a controllable way, which means are connected to the control- and calculating unit 17, being a part of the device according to the invention, of the vehicle for transferring signals. In said unit there is a detailed three-dimensional computer model of the driving compartment 41 of the vehicle, in this case created by means of the device which is described in the Swedish Patent Application No 000 3373-8. The positions and/or orientations of these obtaining means 39 are well specified relative to the coordinate system of this model, by the defined/controlled mechanical connection.

The driver 8 has on the head 10 arranged a headset 13, which constitutes a means for connecting the head 10 to a stimulation generating member 14 according to the invention, including the transducer 5, which determines the position and orientation of the head 8 in totally six degrees of freedom relative to the environment, such as relative to the driving compartment 41, and transmits this position- and orientation information to the control- and calculating unit 17 included in the device and which unit is placed separately and in a safe way. The stimulation generating member also includes two obtaining means mechanically connected to the device, one for each eye, which measure the viewing direction of the respective eye, two further means, one for each eye, which measure the focusing of the respective eye, and two means, one for each eye, which measure the size of the aperture of the respective pupil. The information from these measurements is communicated to the control- and calculating unit 17. In the stimulation generating member 14, a unit 12 for transferring stimuli is further included, which comprises two stimulation means, one for each eye, each consisting of a means for picture generation directly to the retina of the type which has been developed by Saab Future, Linköping, Sweden, and each a means in the form of a LCD-display, which has the capability to be either transparent or imperious to light as regards each pixel in the resolution of the display.

Furthermore, the control- and calculation unit 17, in the simplest embodiment of this example, has been provided with a number of rules related to in which directions and extensions picture information, having correct scale and perspective and being extracted from said means for obtaining picture information, shall be introduced in the milieu which is to be given to the driver directly or by picture possessing.

Thus, the picture information from the external environment is to be realised to the driver by means of the transferring units such as if there would have been corresponding openings, periscopes or transparent windows in the walls of the vehicle at given locations. Thus, the transferring unit realises a milieu including one or more fictitious windows 44 with picture information 43, having correct scale and perspective, about the external environment 40, and the driver's picture of the remaining environment.

In this connection, the information from the external obtaining means 39, from a transducer 5, from the means for determination of the direction of gaze, focusing and the size of aperture, will be taken into account in the control- and calculating unit 17 having the detailed model of the driving compartment and transmitted to the means 12 of the transferring unit for transferring visual information in such a form and in such a way that the means for creating pictures on the retina, which pictures are directly inserted and connected to the real visual impressions the driver gets in the parts of the fields of vision where the visual impression is not blocked and substituted with the picture directly generated on the retina. Thus, by the realised milieu the driver may experience that he/she sits in and drives a vehicle having real windows where the pictures the driver sees in the fictitious windows 44 of the external environment in this case are to be regarded as a part of a fictitious phenomenon inserted in a real environment. The present device according to the invention in accordance with said embodiment gives by its accuracy of the determination of position and orientation of the transducer possibilities to create seamless realistic experiences of a milieu, which all in all creates a driver's milieu with the advantage that the driver, or the head of the driver, is not restricted to be placed in certain positions and/or orientations, or be present within very limited intervals thereof, to be able to see said fictitious windows where they are defined. Furthermore, the same device may be used with advantage by the driver, when the driver goes outside the vehicle for example to repair external obtaining means or engines, the driver receiving information about exchange of objects presented as super-imposed picture information in the same way as in the example herein with reference to FIG. 1.

In a variant of the embodiment having the military vehicle 38 according to the previous example, the driver 38 is provided with a portable component, consisting of push-buttons and an effecting means, where information about the status of the push-buttons may be transferred to the control- and calculating unit 17 of the device according to the invention. By means of this component, the driver may choose between a number of sets of models for fictitious windows 44 which sets are predefined in the control- and calculating unit 17. Particularly, it may be mentioned the possibility to create a set of fictitious windows which also contain fictitious rear view mirrors, so that the driver exactly such as in case of an ordinary car may direct the head forward within a limited sector and still perform actions as reversing or parking.

In a further embodiment of the example of the military vehicle, the external obtaining means 39 include IR-cameras for obtaining information about the external environment in the night and/or when fog is present. It should be pointed out that also drivers in vehicles having windows may with advantage use the device according to the invention in this embodiment. Especially, full light may be used in the driving compartment to give a maximal clarity to the instruments and controls, at the same time as amplified pictures from the external environment are inserted in the real environment of the driver.

In a further embodiment of the example of the military vehicle, a means for simulation in the form of a computer, together with the control- and calculating unit 17, and one or more external position and/or orientation transducers attached to the military vehicle are included, which transducers with advantage are of a construction corresponding to that used in the device according to the invention, if the environment is of semi-indoor type, for example a town environment, the information about for example other simulated military vehicles in the form of fictitious objects may be added to the milieu realised by the device according to the invention. Particularly, the device for obtaining information about an environment described in the Swedish Patent Application no 000 3373-8 may be used so that also a previously unknown external environment may be investigated and used. This example shows still more the flexibility and the wide usefulness that the device according to the invention has compared to similar solutions, which would require many different technical solutions.

It should be pointed out that one advantage of the said examples of the military vehicle is that similar devices according to the invention, using the same or different calculating units, in the latter case connected via a ordinary high-speed-LAN (Local network in the vehicle), may be used by the driver as well as by other functionaries present in the vehicle, such as for example a marksman. In a case with both a marksman and a driver, each person may place their fictitious windows where it suits the respective person considering the shape of the environment and the internal design of the vehicle. Also, the passengers accompanying in the vehicle may use equal devices, and when they leave the vehicle for commissions outside the vehicle, for example in the vicinity of the vehicle, they may utilise the same equipment based on the device according to the invention for creating real milieus from these environments and other objects, to perform other kinds of commissions. In many cases, it is important not to have several types of equipment for co-operating staff or staff in the same organisation. The device according to the invention enables that the equipment is designed for many widely differing fields of application with the use of same components.

In FIG. 5, which is used for illustrating not only this first example, but also a number of further examples below, a match in fictitious tennis in a real environment is arranged. A person 8, the player, in one embodiment of the invention, carries on the head 10 a means in the form of a so-called headset 13, by which the head 10 of the player is connected to the device according to the invention. Said device includes in this embodiment a transducer 5, a transferring unit comprising two means 12 for transferring information to the eyesight, one for each eye, and three means 15 for transferring information to be perceived by the auditory organ/organs—one for each ear, and one arranged on the scull, and a control- and calculating unit 17. In the latter unit, there is an implemented model of the environment, the real room, in which the game is to be going on. The opponent is constituted by an opponent simulated by the control- and calculating unit 17, or by another simulation means communicating with the control- and calculating unit, and in its most simple form the opponent is represented by a fictitious racket 28 only which is visible to the player by the milieu created by the transferring unit.

The transferring means for visual information 12 is in this example constituted by equipment with the capability to project a picture on the retina of the eye to be superimposed with the picture normally incident from the environment. The respective transferring means 15 arranged to transfer information perceived by the auditory organ/organs is constituted by an earphone, please see FIG. 6, having three loudspeaker elements 45, two of which are arranged on each side of the ear 46 just below the auditory megatus and one just above the auditory megatus 47, which loudspeaker elements 45 are arranged at well defined distances from the auditory megatus 47 and with well defined positions and/or orientations in the coordinate system of the stimulation generating member which system is defined by the transducer 5 via the headset mechanically connected to the transducer 5. The special transferring means arranged on the top of the head consists of a vibration element arranged directly against the scull in a position well defined in the coordinate system of the transducer.

Furthermore, the player holds a component 26 in his hand. Said component is intended to constitute a tool for performing the actual playing act, to hit a ball in tennis, for instance. The tool is designed as a handle of an ordinary tennis racket and includes a further transducer which is arranged to determine its position and/or orientation relative to the real environment in six degrees of freedom, and which is mechanically fixed connected to the component otherwise freely movable and to an effecting means for communication of information to the control- and calculating unit 17.

In this example, a physical object in the form of a suspended lamp 30 is present in the environment, but the object could be any occurring real object. This object is modelled in the control- and calculating unit 17. Furthermore, in the control- and calculating unit 17 there is stored information about the fictitious ball 29, a fictitious tennis net 24 and fictitious tennis lines 25, calculation models for how a tennis ball physically acts and other rules for how the game tennis is performed in the real world.

Initially, the situation in the middle of a fictitious tennis game of the kind mentioned above is described herein. Information about the position and orientation of the head of the player is obtained from the transducer 5 and is transmitted to the control- and calculating unit 17. Therein, the parts of the real room which are in the field of vision of the person is calculated by combining the stored model of the environment and the information about the position and orientation of the head 10 of the player, including the position and orientation of the sensory organs located on the head. For a possible calculation of the sound information certainly the whole fictitious milieu is used in the calculations. Also, the information about the position and orientation of the tool component 26 is used for calculating if and where in the field of vision of the player the own fictitious racket is present. Furthermore, the information about the fictitious tennis net 24 and the position 25 of the lines, and the position of the fictitious ball 29 as a function of the other information and history are calculated. It should be noted that by means of time sequences of the position- and orientation information of the tool component, the parameters, such as forces and accelerations when the fictitious ball is hit, may be calculated, and thereby the conditions to calculate the movement path of the fictitious ball in every point of time are created. Information about where and how the pictures of the fictitious net 24, the fictitious ball 29, the fictitious lines and the fictitious racket 28 of the simulated opponent are to be generated, is then transmitted from the control- and calculating unit 17 to the transferring unit and its means 12 for transferring information to the eyesight. Also information about the player's own fictitious racket 27 is generated so that it is added to the real picture of the component 26 which the player sees. Said transferring means realises the fictitious part of the milieu by projecting a picture directly on the retina and the real part is obtained in the usual manner through the eye.

Correspondingly, for example the fictitious sound sources that are present are modelled in the control- and calculating unit 17. For example sounds from how it would sound when a ball hits a racket under given conditions or when a ball hits the floor and bounces. The fictitious sound is then converted, considering both fictitious objects and the properties of the real environment, to the properties the sound has in the points in the coordinate system of the transducer where elements for production of sound and vibration of the means 15 of the transferring unit for transferring sound information are located. This information is realised to the player in the milieu by means of the means for transferring stimuli to be perceived by the auditory organ/organs. At the same time, if transferring means are not closed, ordinary sounds from the real environment may be heard.

Thus, by the realised milieu for both hearing and vision, the player 8 may experience a very realistic tennis game in a real environment, where the player is allowed to move in the same way as if it would have been a real tennis match to be able to beat his fictitious opponent. Advantageously, the game may be played in premises and at places which require non or minimal preparation to enable that the play is arranged. This is true at the same time as a accuracy which gives realistic pictures of the realised milieu may be obtained. It may be noted that the physics of tennis already is well modelled as regards ordinary display-based computer games.

When the fictitious match takes place in a real environment, in this case with an additional object in the form of a lamp 30, it may be chosen to consider or not to consider this lamp in the model in the control- and calculating unit 17. In a more sophisticated embodiment of the device according to the invention compared to the tennis example presented so far, a transparent LCD-display located in the field of vision is used as a part of the transferring means to stimulate the eyesight, which display has the feature that it may stop or let light through in each pixel on its surface. In this connection, on the basis of said model of the environment and position- and orientation information from the transducer 5 of the device, the control- and calculating unit 17 may put the light from the real environment that creates the picture of the lamp out by means of the shields 12. This is possible since the position and orientation of the shields may be determined with the knowledge about the position and orientation of the transducer. Thereby, the fictitious ball 29 appears to be able to move unhindered in the realised milieu. This effect may be obtained only if the accuracy in both the model and the position- and orientation information for the field of vision of the player are of at least the same size as the solution of the eye, i.e. approximately 1 minute of arc.

In another embodiment of said tennis example, in the calculation of the path of the fictitious ball 29 it is considered that a lamp 30 is present in the environment. Thus, the fictitious ball 29 may bounce against the lamp, and thereby a more complicated playing situation is present. Thus, the player may create more challenging game variants or play the game in milieus which otherwise would be inconceivable. As an example, it is not economically reasonable to play ordinary tennis in rooms having low hanging big cut-glass chandeliers. To obtain a high degree of realism in the realised milieu, the model of the physical object has to be of high accuracy. For the purpose of illustrating the flexibility of the device according to the invention, in one embodiment the device is provided with obtaining means for information about an environment, and the device according to the invention is arranged to share transducer and control- and calculating unit with this means. In that connection, also movable objects in the room may be modelled and directly effect the tennis game by that the player acts on the basis of the information from the realised milieu.

In a further example, it is illustrated that the tennis game in the previous example of embodiment not in any way is restricted to a fictitious opponent. A real opponent—player—may be equipped with a similar device according to the invention arranged so that in a specific embodiment the both devices according to the invention share one control- and calculating unit in common. In this connection, two sets of position- and orientation information will be transmitted to the control- and calculating unit in common for calculating the path of the fictitious ball, and the respective fictitious racket of both players, and the net and lines, in such a way that the information is created for respective players transferring unit and is transmitted thereto. In a variant of this example, the two players are present in the same physical environment. If the means for transferring information received by the auditory organs are arranged so that a sound from the real environment is not locked out, the visual impressions and the hearing impressions are taken from the environment to a great extent and from the information about the fictitious phenomena transferred to the transferring units by the control- and calculating unit to a smaller extent when the respective player's milieu is realised.

In a further variant of the example of embodiment having two tennis players, these two players are located in an environment each in the form of two different rooms, which are constructed so that the area in the respective room which is used as a court in common has the same geometrical properties or at least by a simple model may be transformed between each other in an easy and unambiguous way. The area outside the respective court may be completely different. This means that when the milieu is realised each player sees completely different backgrounds, and has different light conditions given by their respective real environments. They have different sound backgrounds etc., but they, by the stimuli from respective transferring units, share the fictitious phenomena in the game/milieu. In this connection, in this simple example, the same visual effect as in a game against a simulated, invisible opponent, where only the fictitious racket of the opponent is visible, is obtained. The game may take place in adjacent rooms as well as more distant rooms. The example shows that the device according to the invention is not limited to completely similar environments where it is used for interactive playing situation including more than one person.

In one embodiment example, an arrangement according to the invention is used, which arrangement comprises two devices according to the invention in accordance with the previous tennis example and a means for establishing a smallest common court. Furthermore, the arrangement includes two obtaining means for obtaining information about an environment to each creature, which means are constructed so that they use an algorithm implemented in either one of the control- and calculating units included in the devices according to the invention or in a separate control- and calculating unit, to compare how great part of the respective environment that has sufficient properties in common to be used as a court in common, starting from a minimal starting environment. The algorithm increases the area gradually and compares which stationary objects that are found in each step of increasing the area. When an obstacle is found in some of the environments, it is investigated if a corresponding obstacle is present in the other environment. In the latter case, if the obstacles have very similar properties, also the obstacle may be included, otherwise the iteration is stopped in the directions which the obstacles define. The algorithm is repeated until no way to increase the area remains. The courts obtained in this way then constitute a meeting place between two worlds for playing games, which may give possibilities to experiences of the kind which are increased to a substantial extent compared to the previous mentioned tennis case where only different pieces of scenery for the respective player are created.

In one embodiment example of the latter mentioned variant of a tennis game, separate control- and calculating units of each player's device and the required input data in common are used. Calculations are communicated via a network, in this special example via Internet, between the both control- and calculating units. In this simple embodiment example, the respective control- and calculating unit provides information about its player's position and orientation, as regards the racket as well as the head, to the other control- and calculating unit. The path of the fictitious ball may be calculated either by a control- and calculating unit in common or by both the units, each having mutual control of the result of the respective unit. The respective calculating unit then calculates the information which is to be transmitted to their own respective transferring units.

In a further variant of the first tennis example above, having only one player with the device according to the invention, other special laws of physics are created in the control- and calculation unit than the usual laws of nature regarding how the fictitious ball will move in the vicinity of a real object, in this specific case a lamp. A lamp, round like a ball, having a repulsive potential of the same type as between two point-shaped electrical particles with opposite charges was modelled therein. This has a great influence on the path of the ball and thereby a different milieu is realised for the player, with the possibility to a different game experience. The example shows that a device may be used to mix properties between pure physical worlds and very special worlds and in that connection illustrate the result in the form of a realised milieu from which a creature may obtain experiences. To create realism also in this situation, it is required that the environment and the fictitious phenomenon is interconnected with a great accuracy.

In an example intended for a player and analogous to the previous variant of the tennis example, the ground is constituted by a yard having an electrical substation to which voltage is applied, which yard includes in such areas usually occurring electrical apparatuses such as breakers, change-over switches, transformers, inductors etc. The property electrical potential of the environment is modelled and implemented into the control- and calculating unit by means of a CAD-model of electric potential around apparatuses of the kind mentioned and the fictitious ball has fictitious electrical properties such as a small charged, point-shaped source. The player may in this case practise his performance to understand how an electrical field behaves around apparatuses. The example shows that the usefulness of the device is not limited to specific types of environments or to be used in non-magnetic disturbed environments, and that the device according to the invention may be used for useful training.

In a more sophisticated embodiment of the previous example, the transferring means for transferring stimuli to the visual organs have an obtaining means for picture information. Furthermore, the path for the light to incident directly towards the eye is blocked by a blocking means in the form of an impermeable shield. The information obtained from the obtaining means is superimposed with the picture information from electrical potentials simulated in the model of the environment, so that information about the electric properties of the environment is represented by different semi-transparent tints seamlessly adapted to the real picture. The transferring unit then generates the whole picture by means of a transferring means for projection of the picture on the retina of the eye. In this case the fictitious tennis ball in the realised milieu may be seen moving in a potential field in the real environment. Although the examples described herein have the character of play and game, the present device according to the invention enables to investigate and visualise, in a realistic way for for example a scientific purpose, phenomena in a milieu which coincide completely or partly with an environment. Characteristic of this example again is that it requires great accuracy of the model as well as of the position- and orientation information about the visual field of the player, which is not possible to achieve when already known devices for creating realised milieus are used if at the same time there is requirements that the function should be obtainable in the most different environments with one and the same device.

The component 26, included in several of the embodiment examples of the device according to the invention described above, in the form of an equipment holder may be provided with a number of control buttons. In that connection, the player may adjust different properties of the fictitious phenomena in the realised milieu. Especially, by a control button the choice of colour of the fictitious lines 25 on the fictitious tennis court may be changed by that control signals are transmitted to the control- and calculating unit 17.

In a tennis example where the means 12 of the transferring unit for transferring visual information comprises an obtaining means for obtaining picture information, a means which blocks the light of the environment, and a transferring means for visual information for directly projection of pictures on the retina, and where the tool component 26 is provided with control buttons, a signal is emitted from a control button to the control- and calculating unit 17 so that the milieu which the player experiences is similar to play on a clay court. In this case, all colours of the floor in the real environment are exchanged for colours in a gravel-like range of colours, and further the person is given an experience of texture and physical conditions corresponding to the clay court. In another tennis example with the same equipment according to the invention as in the previous example, a real opponent uses the control buttons of the modified equipment component for changing fictitious clothes on the opponent via simulation in the control- and calculating unit. In the next step of this example, one of the players choose via a control button to activate a special calculating module in the control- and calculating unit with the purpose of making himself invisible to his opponent. This requires seamless inserting of milieus behind the opponent. Thus, a very great accuracy of the detailed model of the environment and of the position- and orientation measurement are required to give a picture which the opponent is not able to outwit through imperfections occurring in the picture and thereby indirectly understand where the other player is present.

It should be emphasised that in the use of the device according to the invention or the arrangement according to the invention are not limited to games of fictitious tennis in the variants described or in other variants. By an easy exchange of models in the control- and calculating unit, the ground may be altered to games, for example golf or in different degrees of sophistication the game Quidditch. (Quidditch is a game described by J K Rawlings in the books of imaginative literature about Harry Potter and in the special publication "Quidditch Through the Ages and Fantastic Beasts and Where to Find Them" (ISBN: 0439284031)). Furthermore, all other forms of games, plays and sports may be performed in an environment with a device according to the invention and be played in a world with fictitious phenomena joined with real pictures of the environment realised in a milieu. The fictitious tennis racket 27 of the equipment component may easily be changed, and during a game in progress, for all types of swords, laser swords, lances, firearms etc. There is nothing against that the equipment component is constituted by for example a real tennis racket or a real sword connected to a transducer of the kind mentioned before. Thus, the equipment a player has may be hidden or generated as a fictitious equipment as well. Games and rules of games may be changed or stored separately in the control- and calculating unit 17.

FIG. 7 illustrates as an example an environment consisting of a number of fictitious musicians 48 in an orchestra, and a listener—a creature—having a variant of the device according to the invention connected to the head 10 by a means in the form of a headset 13. In this case, the device includes a transducer 5 of the kind mentioned in previous examples, a transferring unit containing a means 15 having three components for transferring a stimulus to the auditory organ/organs, and a control- and calculating unit containing three-dimensional representation of the environment, and also in this particular case a data base with recordings of the sounds from different instruments playing the same piece of music—in the same tempo—with indication of positions and directions from respective instrument to the microphone/microphones which has been used in the recording. Two of the three components of the transferring means for sound Information are constituted by three loudspeaker elements 45 arranged around the ear 46 of the creature according to FIG. 6, where the position and orientation of the respective loudspeaker element relative to the transducer are fixed and well known. The third component is constituted by a vibration element 49 located on the head of the creature in a known position and with a known direction relative to the transducer.

When the listener carrying the device according to the invention moves in the room or moves his head 10, information about the position and orientation of the head will be transmitted to the control- and calculating unit 17. In the control- and calculating unit 17 a calculation is performed, starting from the existing model of the environment, with the location of the different fictitious orchestral members 48 either as they sat in a possible recording in common or as defined in the model that they are to be placed. At each new calculation occasion when the sound picture is calculated such as strength and delay, among others the very exact point of time when the recording is/was made is considered, and the properties of each separate sound, in the points where the means of the transferring unit for sound formation and/or formation of vibrations are located, are considered. The signal made by every sound for each means for sound formation in the transferring unit is transmitted to respective means and realises an acoustic milieu to the listener, the milieu being position- and orientation dependent. Thereby, the listener may choose to walk around in the orchestra and hear how it sound from different positions or to retreat from the orchestra so as to listen to the music from a distance.

In one embodiment of the device according to the invention used in the previous example, information about the acoustic properties of the environment are stored as a model. Hereby, the realised milieu becomes in one sense a joining of a real environment and a recorded piece of music.

In another embodiment of the device according to the invention used in the previous example, the listener may choose to exclude the first violin in the recorded orchestra and seat himself with his violin in the thought position where the first violinist otherwise should have sat and play. In this case, for example the transferring unit is completed by obtaining means for sound formation in the form of a microphone for each transferring means for sound transmission to be able to superimpose the real sound with the sound fictitiously achieved. The realised milieu may be described as a generalised karaoke-apparatus.

In a further variant of the previous embodiment example, there is a further listener provided with a second device according to the invention, where this second device has a control- and calculating unit in common with the first listener's device, but where the second listener's transducer transmits also its position- and orientation information. The second listener receives stimulation information, for the position and orientation of his device in the real environment, from the control- and calculating unit in common to his transferring unit. Thus, the milieu realised gives possibility for the second listener to hear an orchestra, which is fictitious except as regards the first violinist. Thus, the device gives a realised milieu which constitutes a joined music experience having a considerable three-dimensional acoustic nature.

In a further example, the previous music listening examples are complemented by that the transferring means for visual information are included in the device according to the invention. Hereby, fictitious musicians may be generated in the realised milieu. In this connection, in one embodiment the same transferring means for visual information as described in the above-mentioned tennis examples is used.

In an environment similar to the environment in the previous example, there is a number of real sound sources, in the present example in the form of real people in an orchestra. The listener is provided with a device according to an invention including a transferring unit consisting of the transferring means for acoustic information according to the previous example, complemented by recording means in the form of microphones at each sound formation element. The microphones are connected so that the information is transmitted to the control- and calculating unit, which analyses the sounds and put the information together with the position- and direction information. In that connection, different sound components may be separated either via en electronic circuit or by a computer programme and only certain sounds, which have the nature that they come from a source which is located along a certain given direction relative to the orientation of the head of the listener, will be brought to the listener via the realised milieu. In this case, the device according to the invention gives the listener a hearing experience in the form of a directed hearing, with the possibility of an absolute direction- and position determination of his own position and orientation. In this connection, it is possible to mix directed and non-directed sounds at the same time in the listener's realised milieu.

In another embodiment of the device according to the invention, the model of the environment, i.e. the room, is combined with different sounds for different phenomena of the room. The device according to the invention, used for example by a blind creature, is designed as in the previous example and arranged so that the model of the environment which is present in the control- and calculating unit creates sound information as a function of distances to different objects in the room. In addition, the blind creature may be provided with a freely movable component included in the device and in the form of an equipment holder of the same kind as described in the tennis examples above having control buttons, which may transmit signals to the control- and calculating unit. In one embodiment, it is chosen to let all sharp corners in the room in the model create a warning sound to the blind creature if the creature in accordance with the position- and orientation information from the transducer approaches a sharp corner. The information is transmitted via a transferring unit to a realised milieu and the blind creature may easily avoid colliding with sharp corners.

It is obvious that the device according to the invention and the method according to the invention are not restricted to the exemplified embodiments only. Several modification possibilities have already been mentioned above. Further such possibilities are obvious to a man skilled in the art once the idea of the invention has been introduced. Accordingly, it is emphasised that the invention is restricted only to the scope of protection which is defined by the following claims and that equivalent embodiments are included within the frame of the patent protection.

The invention claimed is:

1. A device for creating a milieu for a creature in a real environment to the creature, the milieu comprising both at least one part of the real environment and at least one fictitious phenomenon, the properties of said milieu experienced by the creature depending on the position and/or orientation of a bodypart of the creature relative to the real environment, the device comprising:
   a member for generating stimuli, said stimulation generating member including
      i) a transducer and
      ii) a connecting means which connects the creature and the transducer so that the relative positions and/or orientations of the creature and the transducer are known within a limited interval,
      said stimulation generating member generating the stimuli by means of information about the position and/or orientation of the transducer, and
   a unit for transferring the generated stimuli to the creature to thereby realize said milieu for the creature,
   wherein the transducer is arranged to determine the transducer's position and/or orientation relative to the real environment by receiving incident optical signals from signal sources in the real environment and recording the relative incident directions of the received optical signals in relation to the transducer.

2. A device according to claim 1, characterized in that the stimulation generating member includes a control- and calculating unit communicating with the transducer and the transferring unit, which control- and calculating unit uses a computer model arranged to provide information about the real environment and about the realized milieu, for calculating the stimuli required and controlling the transferring unit.

3. A device according to claim 1, characterized in that the transferring unit includes a means for transferring the stimuli via the visual organs of the creature.

4. A device according to claim 3, characterized in that the transferring means is designed to transfer the stimuli through impulses directly to the optic nerve of the creature.

5. A device according to claim 3, characterized in that the transferring means is designed to transfer the stimuli by projecting pictures directly into the eye/eyes of the creature.

6. A device according to claim 1, characterized in that the transferring unit includes a means for transferring the stimuli via the auditory organs of the creature.

7. A device according to claim 6, characterized in that the transferring means is designed to transfer the stimuli through impulses directly to the auditory nerve of the creature.

8. A device according to claim 6, characterized in that the transferring means is designed to transfer the stimuli by mechanically bringing the skull of the creature or some part of the auditory organ into vibration.

9. A device according to claim 1, characterized in that the transferring unit includes a means for transferring the stimuli via the tactile organs of the creature.

10. A device according to claim 9, characterized in that the transferring means is designed to transfer the stimuli by controlling the temperature of at least some part of the real environment to the creature so that the heat is absorbed/emitted by the creature from/to the environment.

11. A device according to claim 1, characterized in that the transferring unit includes a means for transferring the stimuli via the olfactory organ of the creature.

12. A device according to claim 1, characterized in that the transferring unit includes a means for transferring the stimuli via the gustatory organs of the creature.

13. A device according to claim 2, further comprising a means for obtaining information from the real environment by recording or measuring one or more properties which the real environment has in one or more positions and/or directions.

14. A device according to claim 13, characterized in that the obtaining means is arranged to communicate with the control and calculating unit.

15. A device according to claim 13, characterized in that the obtaining means is arranged for detecting the position and/or orientation that the eye/eyes of the creature has/have relative to the real environment.

16. A device according to claim 13, characterized in that the obtaining means is arranged for detecting the position and/or orientation that the ear/ears of the creature has/have relative to the real environment.

17. A device according to claim 13, characterized in that the obtaining means is arranged for detecting the focusing of the eye/eyes of the creature.

18. A device according to claim 13, characterized in that the obtaining means is arranged for detecting the size of the opening of the eye/eyes of the creature which opening lets light in.

19. A device according to claim 1, characterized in that the transducer is arranged to repeatedly determine the transducer's position and/or orientation relative to the real environment when the transducer and the real environment are moved relative to each other.

20. A device according to claim 1, characterized in that the transducer is arranged to be freely movable by the creature and mechanically unguided by the real environment in an arbitrary co-ordinate system when the transducer and the real environment are moved relative to each other.

21. A device according to claim 1, characterized in that the transducer (5) is designed with a signal receiving direction area, that constitutes a solid angle exceeding 0.2 steradians, and which is formed by the collected amount of signal receiving directions in which the transducer is arranged to receive incident signals from said signal sources (9)

22. A device according to claim 21, characterized in that the signal receiving direction area of the transducer (5) constitutes a solid angle that exceeds 1 steradian.

23. A device according to claim 21, characterized in that the signal receiving direction area of the transducer (5) constitutes a solid angle that exceeds 2 steradians.

24. A device according to claim 21, characterized in that the signal receiving direction area of the transducer (5) constitutes a solid angle that exceeds 4 steradians.

25. A device according to claim 21, characterized in that the signal receiving direction area of the transducer (5) is topologically connected.

26. A device according to claim 1, characterized in that the transducer (5) is arranged to determine the transducer's position and/or orientation with respect to at least two degrees of freedom relative to the environment.

27. A device according to claim 26, characterized in that the transducer (5) is arranged to determine the transducer's position and/or orientation with respect to at least three degrees of freedom relative to the environment.

28. A device according to claim 27, characterized in that the transducer (5) is arranged to determine the transducer's position and/or orientation with respect to at least four degrees of freedom relative to the environment.

29. A device according to claim 1, further comprising a component portable by the creature for transferring signals to the stimulation generating member and thereby control the function thereof.

30. A device according claim 29, characterized in that the portable component is arranged to constitute an equipment for accomplishing an action in the milieu realized for the creature by the way that the creature moves the component relative to the real environment.

31. A device according to claim 29, wherein,
the portable component includes one of i) said transducer and ii) a further transducer, and
said one of said transducer and said further transducer is further arranged to determine said portable component's position and/or orientation relative to the real environment.

32. A device according to claim 1, characterized in that said at least one fictitious phenomenon is designed to follow specially defined physical laws.

33. A device according to claim 1, characterized in that the transducer is arranged to determine the transducer's position and/or orientation with respect to at least two degrees of freedom relative to the real environment.

34. A device according to claim 1, characterized in that the transducer is arranged to determine the transducer's position and/or orientation with respect to at least three degrees of freedom relative to the real environment.

35. A device according to claim 1, characterized in that the transducer is arranged to determine the transducer's position and/or orientation with respect to at least four degrees of freedom relative to the real environment.

36. A device according to claim 1, further comprising a connection to a local and/or global network.

37. An arrangement, comprising:
a) two or more devices connected to a network for creating a milieu for one or more creatures in a real environment to the creature by means of respective device, said milieu comprising both at least one part of said real environment and at least one fictitious phenomenon, said properties of said milieu experienced by each creature depending on the position and/or orientation of a body-part of each creature relative to said real environment,
each respective device comprising
a member for generating stimuli, said stimulation generating member including i) an optical transducer arranged to determine the transducer's position and/or orientation relative to the real environment by receiving incident optical signals from signal sources in the real environment and recording the relative incident directions of the received optical signals in relation to the transducer, and ii) a connecting means which connects the creature and the transducer so that the relative positions and/or orientation of the creature and the transducer are known within a limited interval, said stimuli member for creating the stimuli by means of i) information about the position and/or orientation of the transducer and ii) information about the real environment, and
a unit for transferring generated stimuli to the creature to thereby realize said milieu for the creature, and
b) a means for establishing a smallest common milieu realized to the creatures, on the basis of the milieus generated, in which each respective creature may effect the properties experienced by the creatures, wherein,
at least one of the transducers determines the relative incident direction of a respective received optical signal in relation to the one transducer by two relative angles defined by $\phi i$ and $\theta i$, $\phi i$ being a first angle measured from a reference line of the one transducer and $\theta i$ being a second angle measured from a reference axis of the one transducer.

38. A method for creating a milieu for a creature in a real environment to the creature, the milieu comprising both at least one part of the real environment and at least one fictitious phenomenon, the properties of said milieu experienced by the creature depending on the position and/or orientation of a bodypart of the creature relative to the real environment, comprising the steps of:
   a) providing the creature with a member for generating stimuli, said stimulation generating member including i) a transducer which is connected to the creature so that the relative positions and/or orientations of the creature and the transducer are known within a limited interval,
   b) generating the stimuli by means of information about the position and/or orientation of the transducer, and
   c) transferring the generated stimuli to the creature to thereby realize said milieu for the creature,
   wherein the position and/or orientation of the transducer relative to the real environment is determined by the transducer receiving incident optical signals from signal sources in the real environment and recording the relative incident directions of the optical signals received, and
   wherein the transducer receives the incident optical signals from the signal sources in the real environment and records the relative incident directions of the received optical signals in relation to the transducer, the recorded relative incident direction of the received optical signals being defined by $\phi i$ and $\theta i$, $\phi i$ being a first angle measured from a reference line of the transducer and $\theta i$ being a second angle measured from a reference axis of the transducer, the $\phi i$ and $\theta i$ of the respective received incident optical signals from the signal sources in the real environment being a basis to determine the transducer's position and/or orientation relative to the real environment.

39. Use of a device according to claim 1 to practise a sport, a game or a play.

40. Use according to claim 39 wherein said sport, game or play has at least one fictitious phenomenon which follows specially defined physical laws.

41. Use of a device according to claim 1 in combination with one or more sensors located outside a vehicle to give the creature within the vehicle an experience of the environment outside the vehicle.

42. Use of a device according to claim 1 to show how an object is to be manipulated relative to an environment.

43. Use of a device according to claim 1 to generate different experiences to different persons who use one and the same transportation means.

44. Use of a device according to claim 1 for at least one of medical work, psychological work, and diagnostics.

45. The device according to claim 1, wherein,
   the transducer determines the transducer's position and orientation relative to the real environment,
   the recorded relative incident directions of the received optical signals are defined by respective $\phi i$ and $\theta i$, $\phi i$ being a first angle measured from a reference line of the transducer and $\theta i$ being a second angle measured from a reference axis of the transducer,
   the $\phi i$ and $\theta i$ of the respective received incident optical signals from the signal sources in the real environment being a basis to determine the transducer's position and orientation relative to the real environment.

* * * * *